(12) United States Patent
Cooke et al.

(10) Patent No.: US 8,620,130 B2
(45) Date of Patent: Dec. 31, 2013

(54) PULLING GRIPS FOR INSTALLING A FIBER OPTIC ASSEMBLY

(75) Inventors: Terry L. Cooke, Hickory, NC (US); David L. Dean, Jr., Hickory, NC (US); Tory A. Klavuhn, Newton, NC (US)

(73) Assignee: Corning Cable Systems LLC, Hickory, NC (US)

( * ) Notice: Subject to any disclaimer, the term of this patent is extended or adjusted under 35 U.S.C. 154(b) by 49 days.

(21) Appl. No.: 12/488,078

(22) Filed: Jun. 19, 2009

(65) Prior Publication Data

US 2010/0052346 A1 Mar. 4, 2010

Related U.S. Application Data

(63) Continuation-in-part of application No. 12/324,279, filed on Nov. 26, 2008.

(60) Provisional application No. 61/197,067, filed on Oct. 23, 2008, provisional application No. 61/190,538, filed on Aug. 29, 2008.

(51) Int. Cl.
*G02B 6/00* (2006.01)

(52) U.S. Cl.
USPC .............................. 385/138; 385/92

(58) Field of Classification Search
USPC .................................... 385/138, 92
See application file for complete search history.

(56) References Cited

U.S. PATENT DOCUMENTS

| | | | |
|---|---|---|---|
| 4,682,848 A * | 7/1987 | Cairns et al. | 385/69 |
| 5,042,891 A * | 8/1991 | Mulholland et al. | 385/93 |
| 5,082,346 A * | 1/1992 | Myers | 385/54 |
| 5,123,071 A * | 6/1992 | Mulholland et al. | 385/53 |
| 5,125,056 A * | 6/1992 | Hughes et al. | 385/59 |
| 5,166,995 A * | 11/1992 | Briggs et al. | 385/58 |
| 5,231,685 A * | 7/1993 | Hanzawa et al. | 385/84 |
| 5,231,688 A | 7/1993 | Zimmer | 385/139 |
| 5,332,270 A | 7/1994 | Petty et al. | 285/319 |
| 5,416,874 A * | 5/1995 | Giebel et al. | 385/100 |

(Continued)

FOREIGN PATENT DOCUMENTS

| | | | |
|---|---|---|---|
| EP | 1245980 A1 | 10/2002 | G02B 6/44 |
| FR | 2601184 A1 | 1/1988 | H01B 7/28 |
| WO | WO89/01109 | 2/1989 | F16L 37/16 |
| WO | WO2007/127177 A2 | 11/2007 | G02B 6/44 |

OTHER PUBLICATIONS

Corning Cable Systems, "Plug & Play Systems Hybrid Pulling Grips for Pre-Connectorized Fiber Optic Cables," SRP-004-106, Issue 1, Jul. 2006, 4 pages.

(Continued)

*Primary Examiner* — Kaveh Kianni

(57) ABSTRACT

Pulling grips for installing a fiber optic assembly are disclosed. The pulling grip includes a pulling grip housing for receiving part of a fiber optic assembly therein. The pulling grip may also include a pulling grip sleeve and/or pulling sock. In one embodiment, the pulling grip housing has a friction fit with the pulling grip sleeve when assembled, thereby inhibiting rotation therebetween. Consequently, the friction fit advantageously inhibits twisting of the fiber optic assembly when installing the same using the pulling grip. In this manner, the pulling grip housing can easily be insert into the pulling grip sleeve and removed when pulling of a fiber optic assembly is completed. The pulling grip housing, pulling grip sleeve, and/or pulling sock may also be reused for pulling other fiber optic assemblies.

9 Claims, 20 Drawing Sheets

(56) References Cited

U.S. PATENT DOCUMENTS

| | | | |
|---|---|---|---|
| 5,473,718 A | 12/1995 | Sommer | 385/87 |
| 5,863,083 A | 1/1999 | Giebel et al. | 294/1.1 |
| 6,206,581 B1* | 3/2001 | Driscoll et al. | 385/78 |
| 6,293,710 B1* | 9/2001 | Lampert et al. | 385/78 |
| 6,550,978 B2* | 4/2003 | De Marchi | 385/60 |
| 6,738,555 B1 | 5/2004 | Cooke et al. | 385/136 |
| 6,899,467 B2* | 5/2005 | McDonald et al. | 385/78 |
| 6,993,237 B2* | 1/2006 | Cooke et al. | 385/135 |
| 7,264,402 B2* | 9/2007 | Theuerkorn et al. | 385/59 |
| 7,654,747 B2* | 2/2010 | Theuerkorn et al. | 385/59 |
| 7,744,286 B2* | 6/2010 | Lu et al. | 385/53 |
| 7,762,726 B2* | 7/2010 | Lu et al. | 385/53 |
| 7,942,590 B2* | 5/2011 | Lu et al. | 385/53 |
| 2002/0191919 A1* | 12/2002 | Nolan | 385/78 |
| 2003/0063867 A1* | 4/2003 | McDonald et al. | 385/78 |
| 2003/0165307 A1 | 9/2003 | Liden | 385/100 |
| 2004/0047566 A1* | 3/2004 | McDonald et al. | 385/78 |
| 2006/0204178 A1* | 9/2006 | Theuerkorn et al. | 385/59 |
| 2007/0025665 A1* | 2/2007 | Dean et al. | 385/78 |
| 2007/0160327 A1* | 7/2007 | Lewallen et al. | 385/53 |
| 2007/0172172 A1* | 7/2007 | Theuerkorn et al. | 385/53 |
| 2008/0175548 A1 | 7/2008 | Knecht et al. | 385/100 |
| 2009/0148101 A1* | 6/2009 | Lu et al. | 385/56 |
| 2009/0148102 A1* | 6/2009 | Lu et al. | 385/60 |
| 2009/0148103 A1* | 6/2009 | Lu et al. | 385/62 |
| 2009/0148104 A1* | 6/2009 | Lu et al. | 385/72 |
| 2009/0310916 A1* | 12/2009 | Luther et al. | 385/60 |
| 2010/0266244 A1* | 10/2010 | Lu et al. | 385/60 |
| 2010/0290741 A1* | 11/2010 | Lu et al. | 385/60 |

OTHER PUBLICATIONS

CommScope, "SYSTIMAX® InstaPATCH® Plus Trunk Re-usable Pulling Grips and Pulling Grips Kit," 2008, 2 pages.

\* cited by examiner

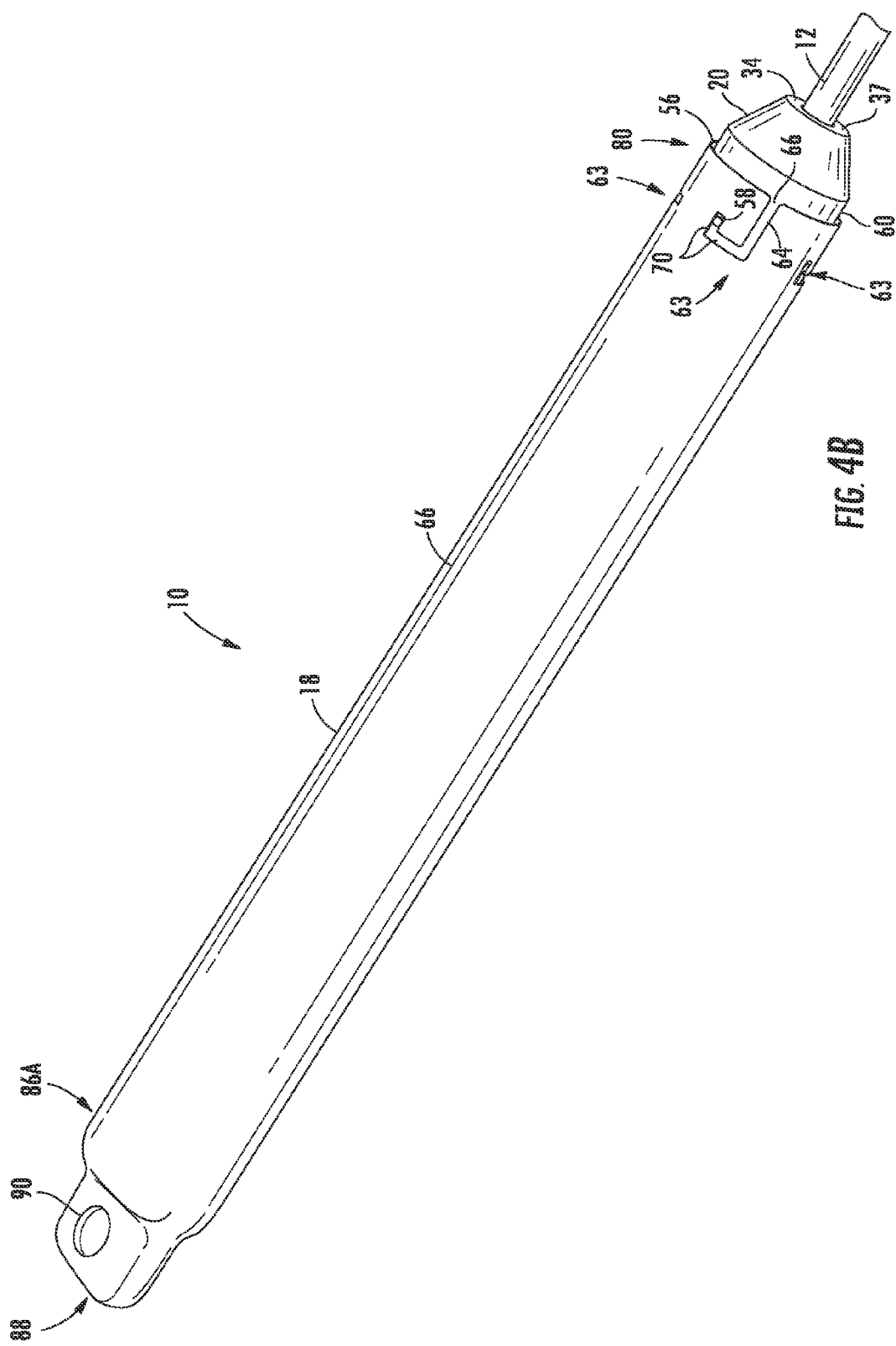

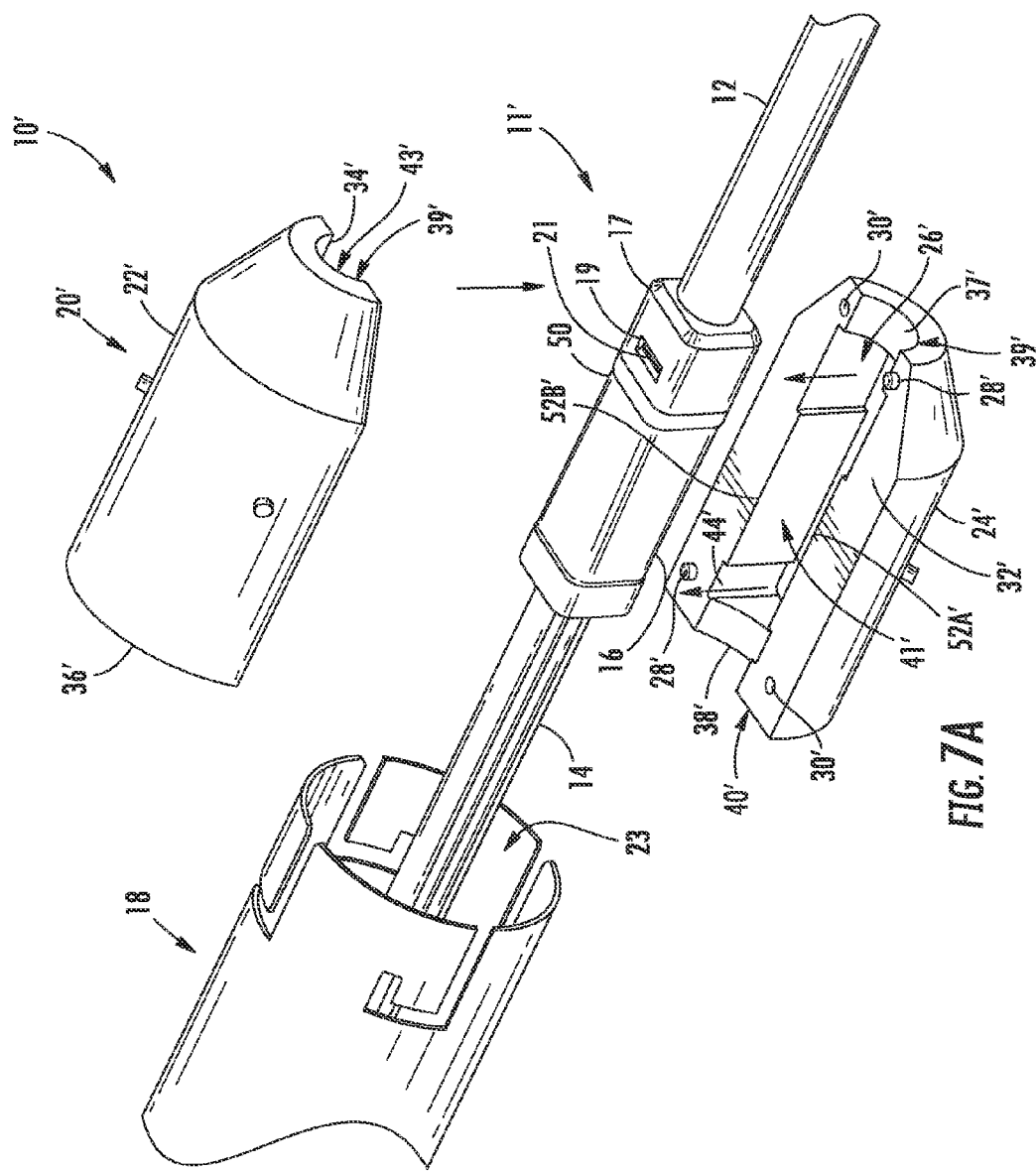

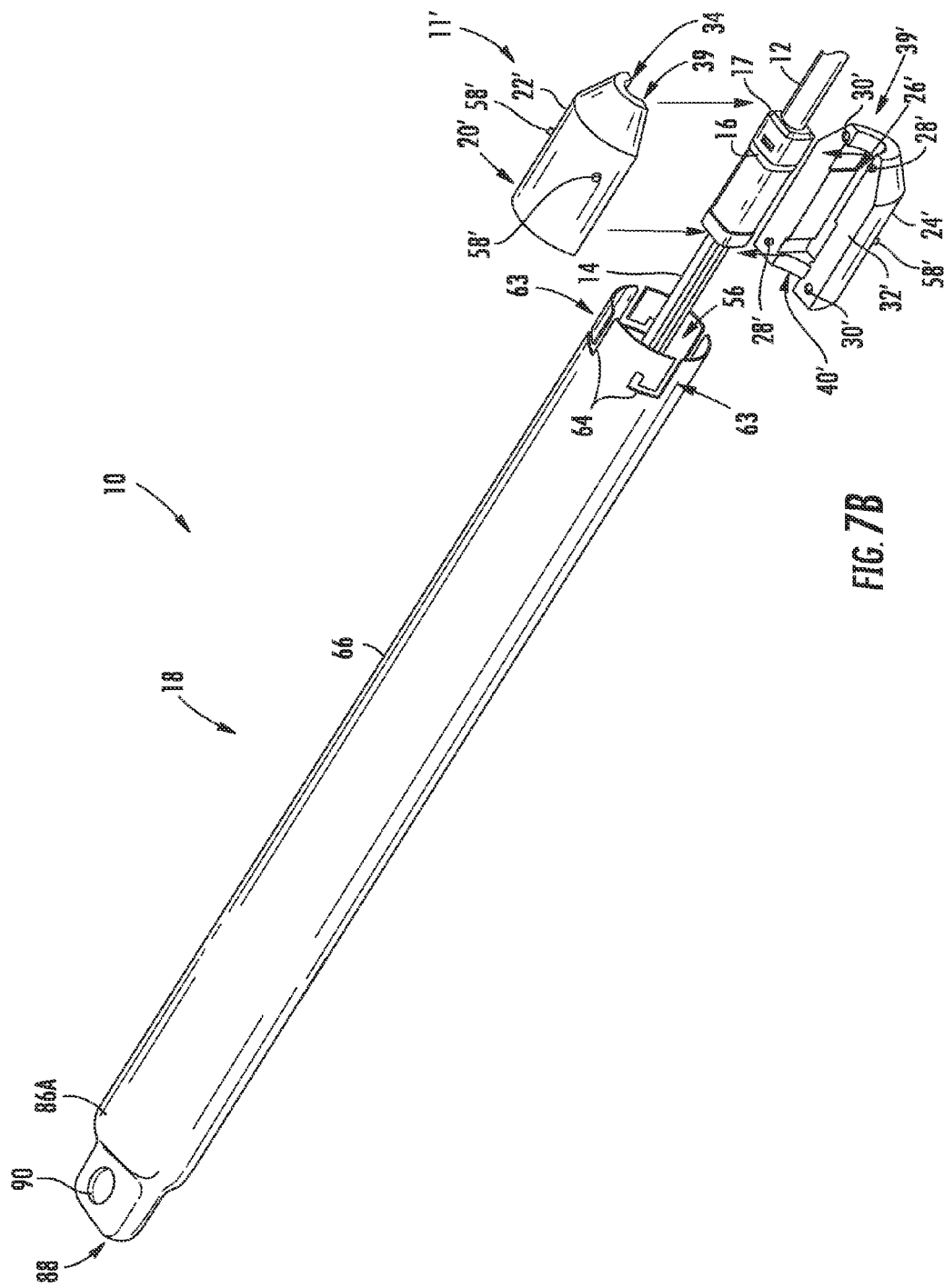

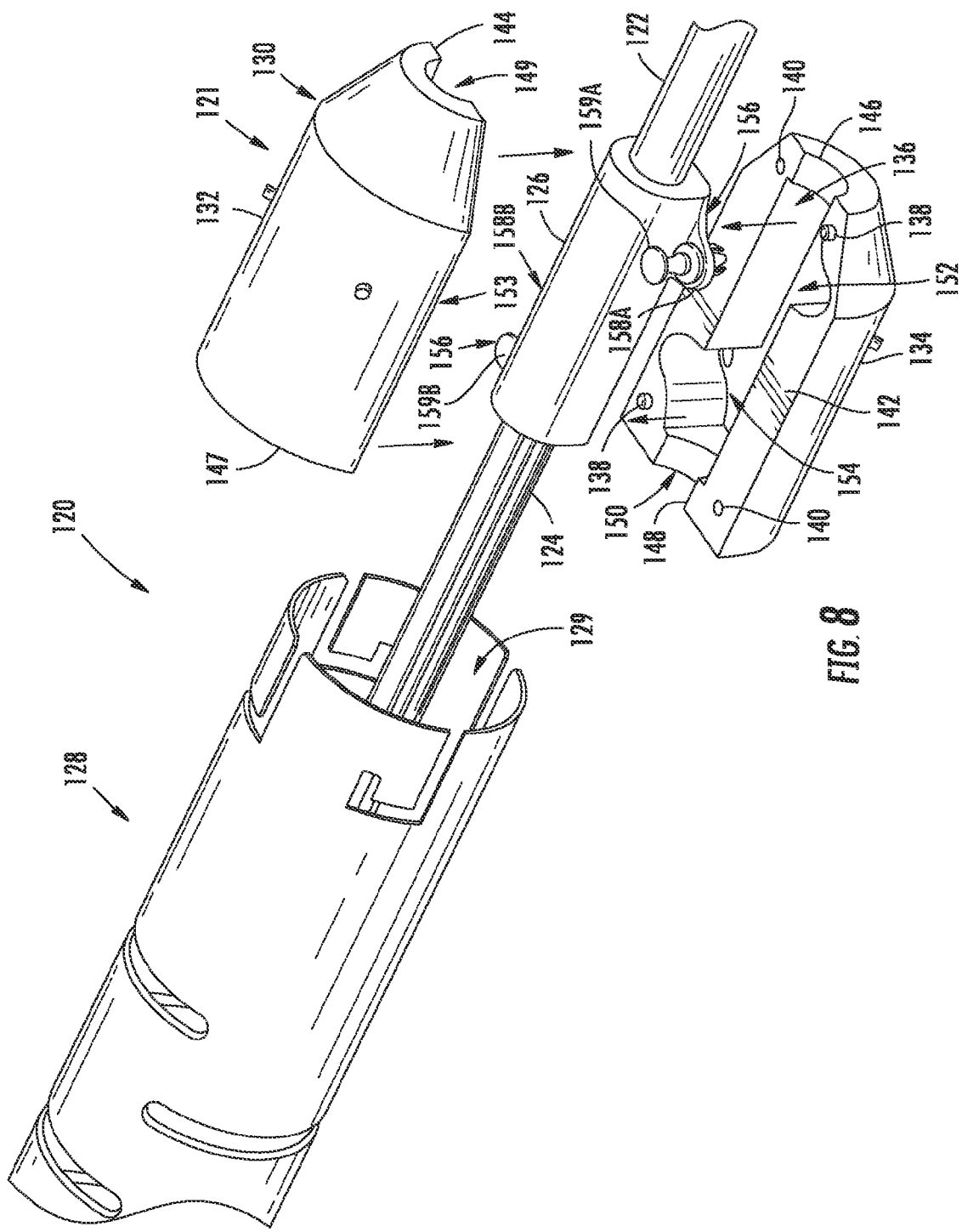

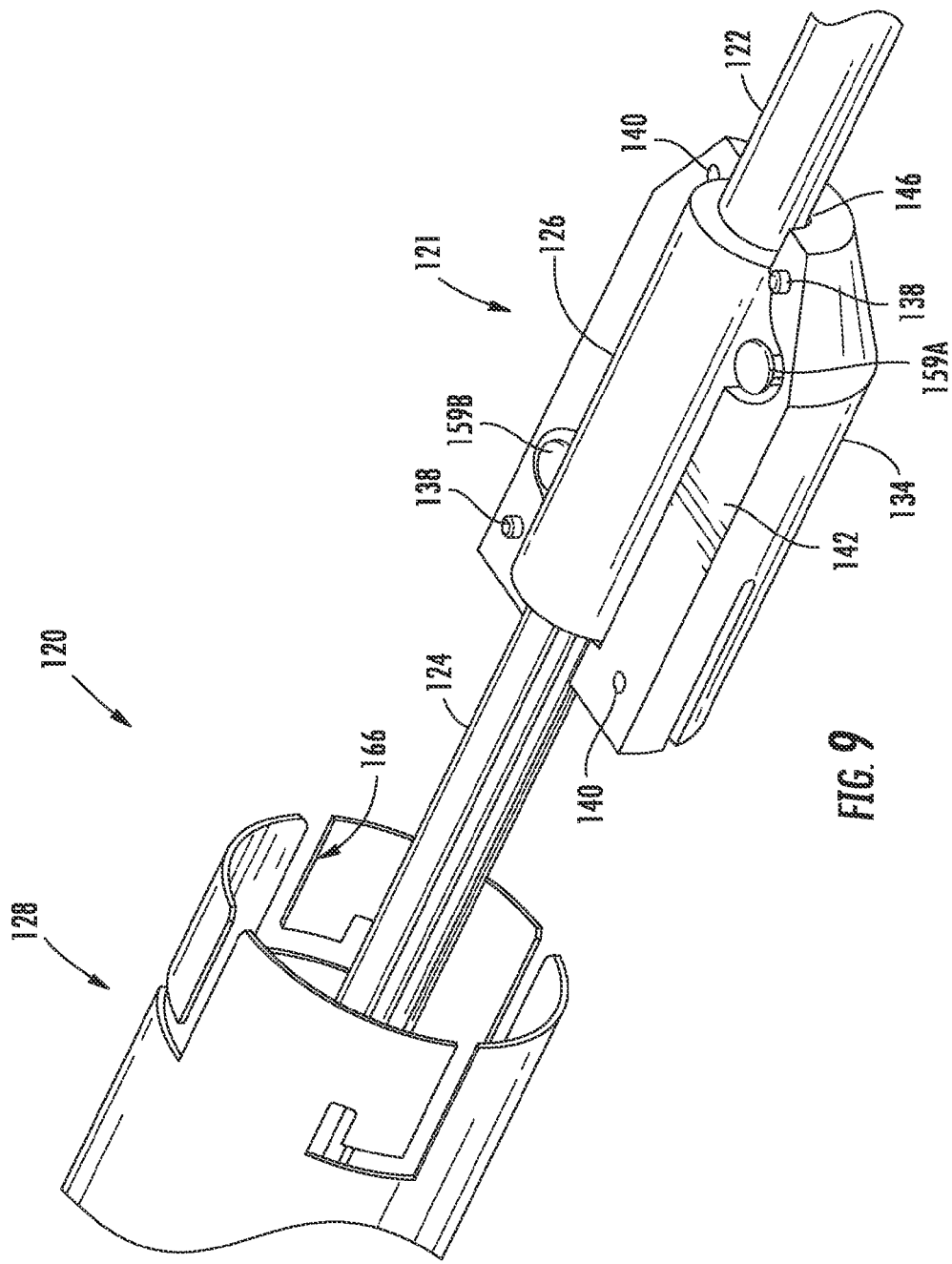

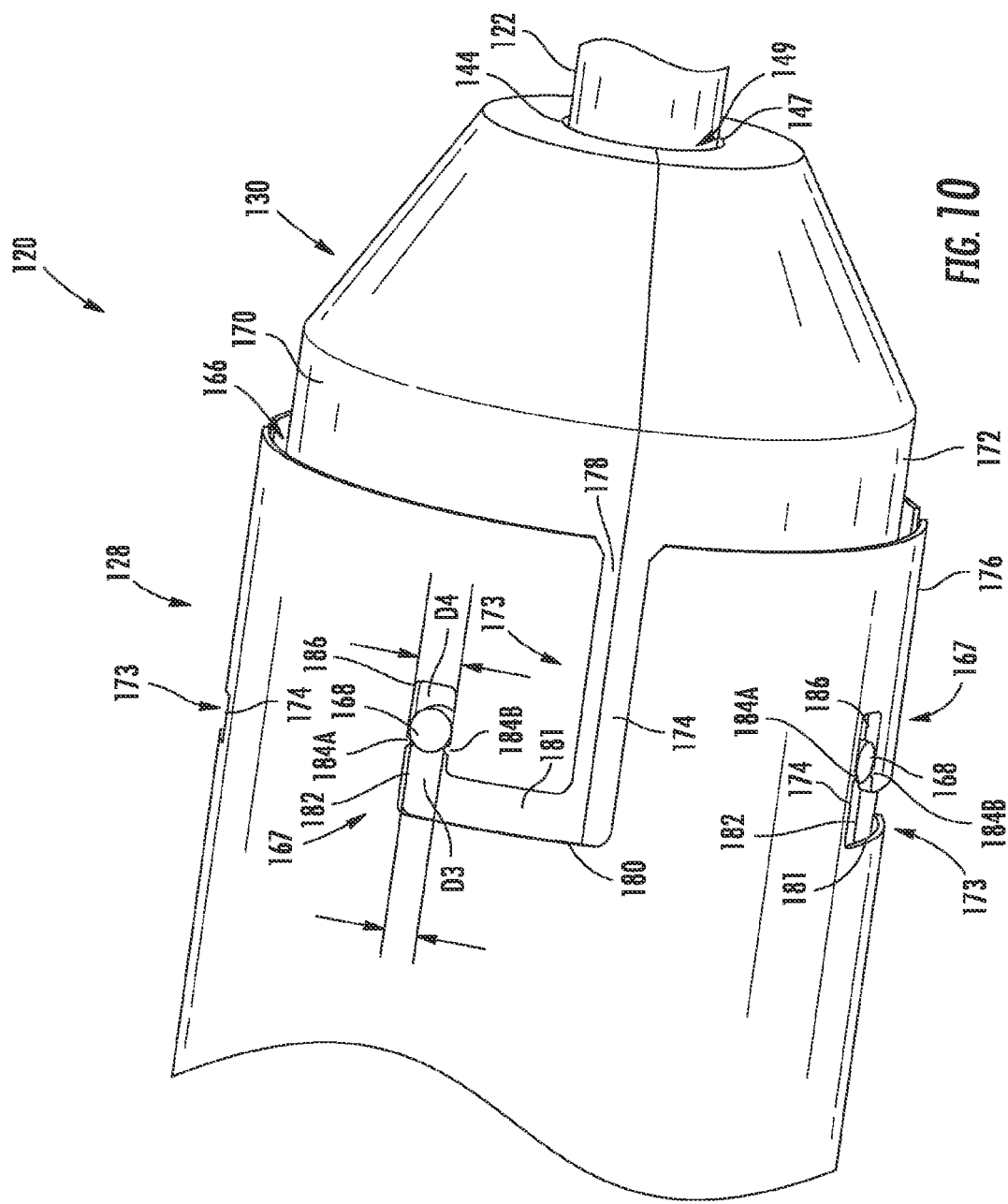

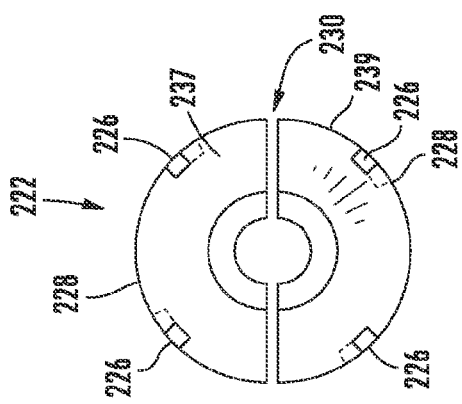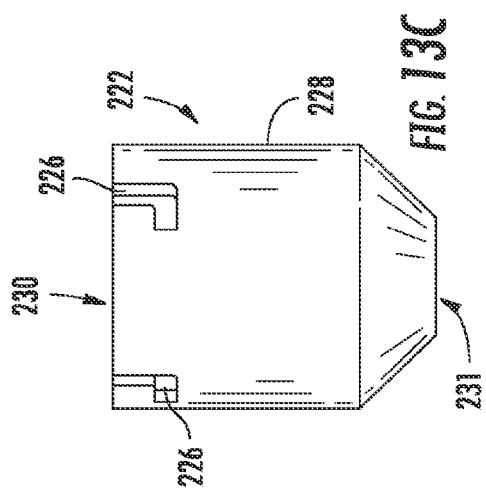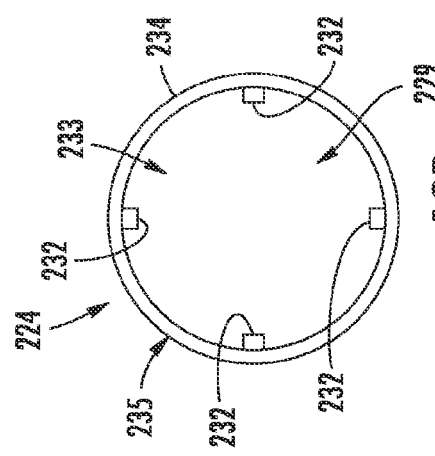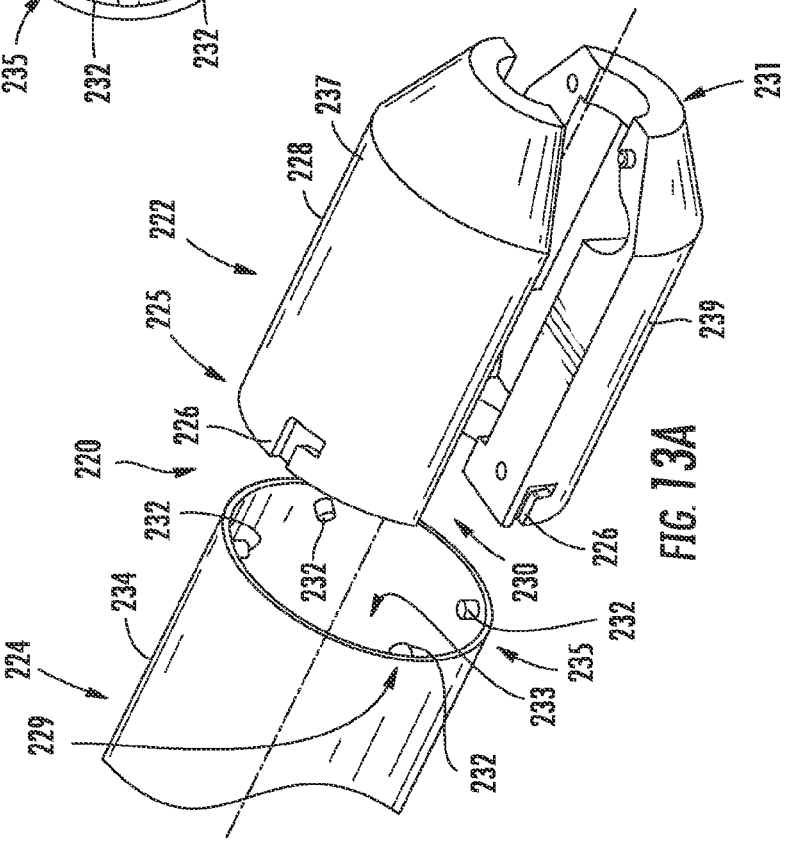

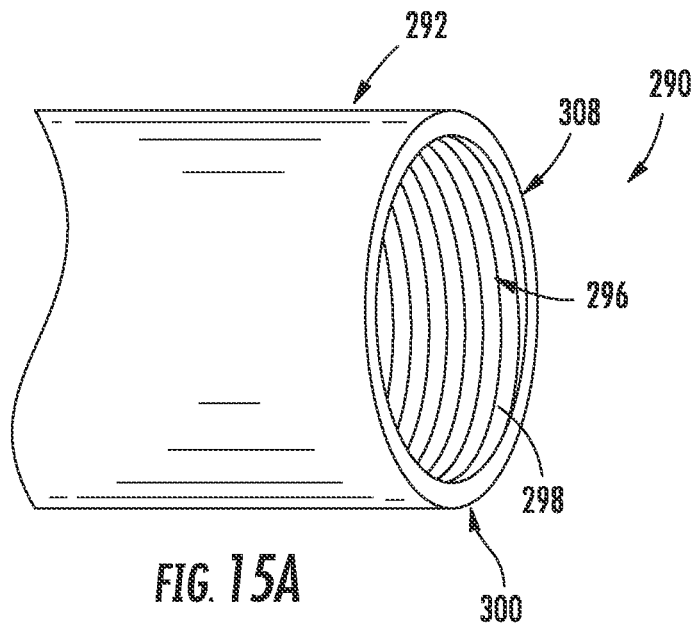
FIG. 15A
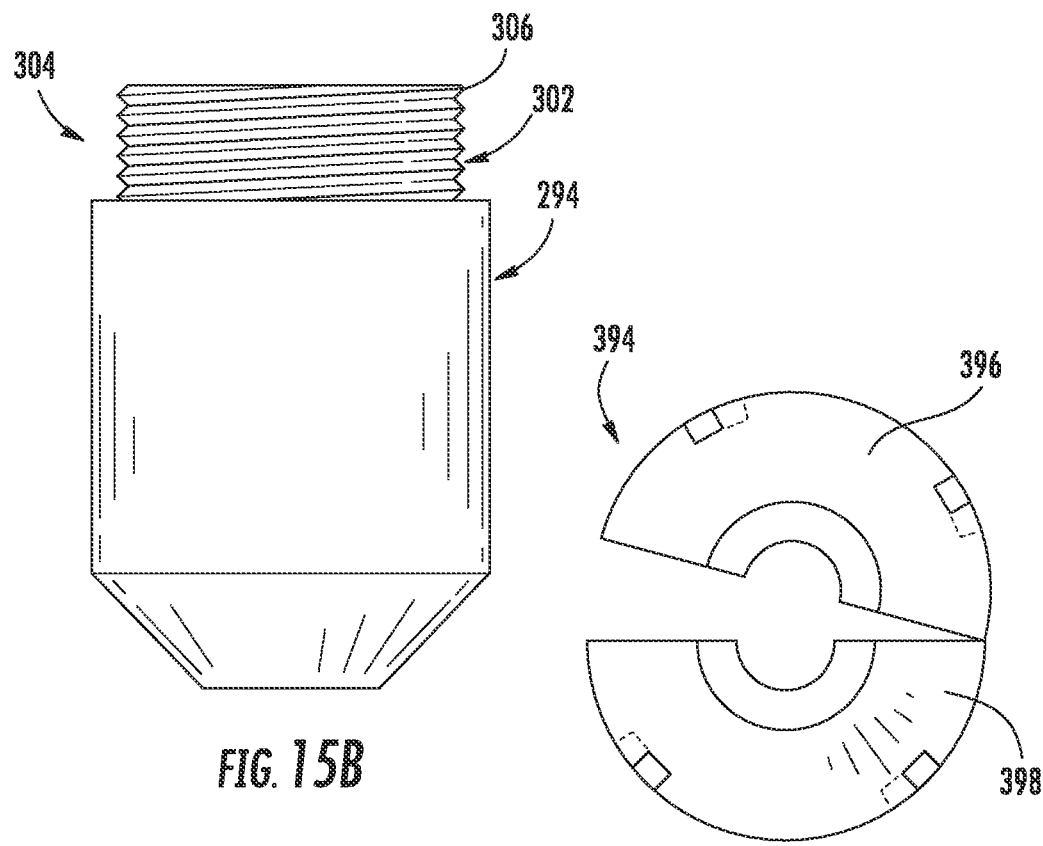
FIG. 15B
FIG. 16

PULLING GRIPS FOR INSTALLING A FIBER OPTIC ASSEMBLY

RELATED APPLICATIONS

The present application claims priority to U.S. Provisional Patent Application Ser. No. 61/197,068 Oct. 23, 2008 titled "High Density Data Center Hardware, Assemblies, and Components," which is incorporated herein by reference in its entirety. The present application also claims priority to U.S. Provisional Patent Application Ser. No. 61/190,538 Aug. 29, 2008 titled "High Density Data Center Hardware, Assemblies, and Components," which is incorporated herein by reference in its entirety.

The present application is a Continuation-in-Part (CIP) of U.S. patent application Ser. No. 12/324,279 filed on Nov. 26, 2008 and titled "Pulling Grip Assembly for a Fiber Optic Assembly," which is incorporated herein by reference in its entirety.

The present application is also related to U.S. Pat. No. 8,301,004 titled "Fiber Optic Cable Assemblies Employing A Furcation Body Having Anti-Rotation Feature," and also related to U.S. Pat. No. 7,903,925 titled "Fiber Optic Furcation Assembly Having Feature(s) For Cable Management," which are both incorporated herein by reference in their entirety.

BACKGROUND

1. Field of the Disclosure

The technology of the disclosure relates to a pulling grip for installing a fiber optic assembly. The pulling grip may be used to pull a fiber optic assembly into position during installation.

2. Technical Background

Benefits of optical fiber use include extremely wide bandwidth and low noise operation. Because of these advantages, optical fiber is increasingly being used for a variety of applications, including but not limited to broadband voice, video, and data transmission. As a result, fiber optic communications networks include a number of interconnection points at which multiple optical fibers are interconnected such as in data centers at racks, patch panels, and the like. Other interconnection points can include, but are not limited to, network access point (NAP) enclosures, aerial closures, below grade closures, pedestals, optical network terminals (ONTs) and network interface devices (NIDs). By way of example, interconnections points in the data center occur between truck cables and distribution cables in an equipment rack or the like. In order to cost effectively and rapidly deploy a data center network, it is desirable to terminate the optical fibers of the cables in a controlled factory environment, thereby forming a high-quality plug and play assembly.

Fiber optic cables having optical fibers terminated to fiber optic connectors at the factory are referred to herein as "pre-connectorized." Preconnectorized cables permit connectivity in the field without removing the jacket of the distribution cable, polishing ferrules and the like, and thereby exposing the optical fibers to adverse environmental conditions, such as moisture, dirt, or dust. Use of preconnectorized cables in a fiber optic communications network can present certain challenges. First, a terminated end of the preconnectorized cable often times must be pulled to a desired location during installation through relatively tight spaces and/or small diameter conduits.

Thus, a terminated end of the fiber optic cable can be provided within a pulling grip. A furcation plug of a fiber optic assembly and furcated legs extending from the furcation plug are placed inside the pulling grip prior to pulling. When pulled, the pulling grip is capable of transferring a high tensile load to the fiber optic cable without inducing relative movement between the furcated legs, the furcation plug, and the fiber optic cable. However, the loading of the conventional pulling grip housings can be labor intensive, because the fiber optic components are typically loaded one at a time in the pulling grip. Thus, fiber optic cables are typically outfitted with a pulling grip in the factory and used for an individual fiber optic cable assembly.

SUMMARY OF THE DETAILED DESCRIPTION

Embodiments disclosed in the detailed description include pulling grip assemblies or simply a pulling grip for installing a fiber optic assembly. In one embodiment, the pulling grip is comprised of a pulling grip housing for receiving part of a fiber optic assembly. A pulling grip sleeve is also provided. When assembled, one disclosed embodiment has a portion of the pulling grip housing is inserted into a portion of the pulling grip sleeve forming a friction fit therebetween. In this manner, the pulling grip housing is easily inserted into the pulling grip sleeve and easily, removed when pulling of a fiber optic assembly is completed. Moreover, the friction fit inhibits rotation of the pulling grip housing and the fiber optic assembly relative to the pulling grip sleeve when installing the fiber optic assembly, thereby inhibiting twisting of the fiber optic assembly during installation. A pulling sock is positioned and secured over the pulling grip sleeve and pulling grip housing for applying the pulling force to the assembly. The pulling grip housing, pulling grip sleeve, and/or pulling sock can also advantageously be reused for pulling other fiber optic assemblies. Other embodiments can include a locking feature between the pulling grip housing and the pulling grip sleeve.

Additional features and advantages of the invention will be set forth in the detailed description which follows, and in part will be readily apparent to those skilled in the art from that description or recognized by practicing the invention as described herein, including the detailed description that follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operation of the invention.

BRIEF DESCRIPTION OF THE FIGURES

FIG. 4B is a perspective view of the pulling grip of FIG. 1 illustrating the pulling grip sleeve comprised of a single pulling grip sleeve section;

FIG. 7A is a perspective exploded view of another exemplary pulling grip receiving an exemplary fiber optic assembly;

FIG. 7B is a perspective exploded view of the pulling grip of FIG. 7A illustrating the pulling grip sleeve comprised of a plurality of removably attachable pulling grip sleeve sections;

FIG. 8 is a perspective exploded view of another exemplary pulling grip receiving an exemplary fiber optic assembly;

FIG. 9 is a close-up perspective view of the fiber optic assembly of FIG. 8 inserted into an internal compartment of the pulling grip housing;

FIG. 10 is a close-up perspective view of the pulling grip housing secured to the pulling grip sleeve of the pulling grip of FIG. 8;

FIG. 13A is a perspective view of an alternate pulling grip having an alternate housing locking feature and sleeve locking feature;

FIGS. 13B and 13C are front and top views, respectively, of the pulling grip housing in FIG. 13A;

FIG. 13D is a front view of the pulling grip sleeve in FIG. 13A;

FIGS. 15A and 15B are side perspective views of alternate locking features for a pulling grip;

FIG. 16 is a front view of an alternative pulling grip housing;

DETAILED DESCRIPTION

Reference will now be made in detail to the preferred embodiments of the present invention, examples of which are illustrated in the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Whenever possible, like reference numbers will be used to refer to like components or parts.

Embodiments disclosed in the detailed description include pulling grip assemblies for a fiber optic assembly. In one embodiment, the pulling grip is comprised of a pulling grip housing that defines an internal cavity for receiving part of a fiber optic assembly. A pulling grip sleeve is also provided that defines an internal chamber. The pulling grip housing and pulling grip sleeve are secured together using one or more locking features. The pulling grip housing has at least one housing locking feature. The pulling grip sleeve has at least one sleeve locking feature suitable for cooperating with the housing locking feature for securing the pulling grip housing to the pulling grip sleeve. In this manner, the pulling grip housing is quickly and easily secured to the pulling grip sleeve and removed when pulling of a fiber optic assembly is completed. The pulling grip housing and pulling grip sleeve can also be reused for pulling other fiber optic assemblies. Thus, each individual fiber optic assembly need not have a dedicated pulling grip, but instead the terminated end of the fiber optic assembly is packaged for quickly and easily fitting within the pulling grip sleeve, but if desired each fiber optic assembly may have its own pulling grip. The fiber optic assembly may include a fiber optic cable and a furcation plug receiving the fiber optic cable.

Figure 1:
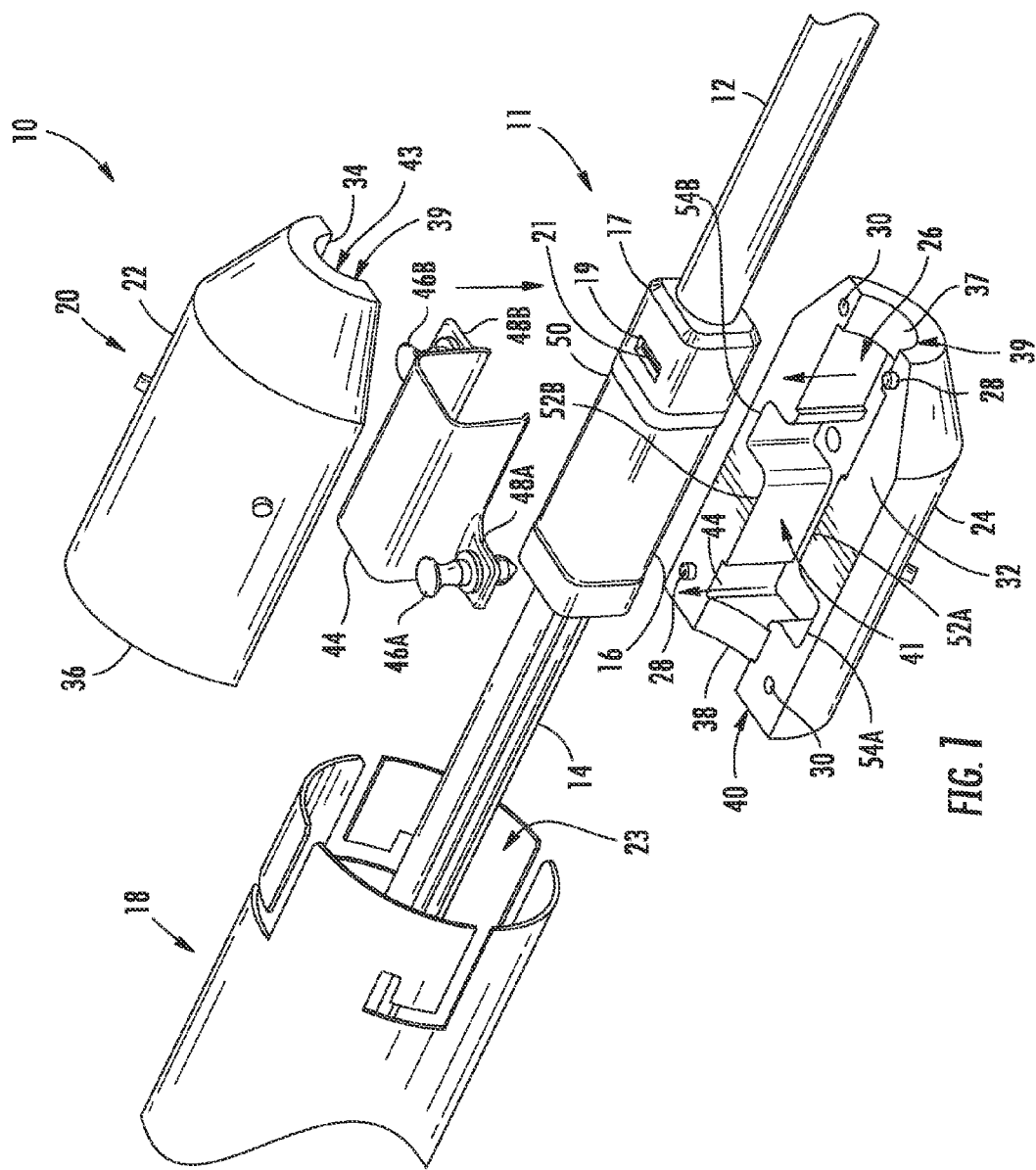
FIG. 1 is a perspective exploded view of an exemplary pulling grip receiving an exemplary fiber optic assembly.

In this regard, FIG. 1 illustrates an exemplary pulling grip 10. As illustrated therein, the pulling grip 10 is shown as receiving a fiber optic assembly 11. The pulling grip 10 is designed to pull the fiber optic assembly 11, such as during an installation, without damaging or minimizing the risk of damage to the fiber optic assembly 11. In this embodiment, the fiber optic assembly 11 is comprised of a fiber optic cable 12 furcated into one or more furcated legs 14 inside a furcation plug 16 receiving the fiber optic cable 12. However, note that the pulling grip 10 can be used to pull any type of fiber optic assembly or component and is not limited to a fiber optic assembly that includes a furcation plug. In this embodiment, an end cap 17 is secured to the furcation plug 16 adjacent the fiber optic cable 12. The end cap 17 is secured via a latch 19 designed to receive a latch finger 21 disposed in the furcation plug 16. The same latch structure may also be disposed on the opposite side of the end cap 17 and furcation plug 16, which is not shown in FIG. 2. As discussed in more detail below, the pulling grip 10 includes a pulling grip sleeve 18 having an annular cross-section 23 that receives an end portion of the fiber optic assembly 10 and the furcation plug 16 and the furcated legs 14. In this embodiment, the pulling grip sleeve 18 does not close around the fiber optic assembly 10 or directly receive the furcation plug 16. The pulling grip sleeve 18 receives a portion of the pulling grip housing 20 that is disposed about and closed around the furcation plug 16. In this manner, when the pulling grip sleeve 18 is pulled, the pulling force is translated to the pulling grip housing 20, which then translates the pulling force to the furcation plug 16 wherein the strength elements of the fiber optic cable 12 may be located. By way of example, the pulling grip can be rated for a 100 pound pulling force, but other ratings are possible.

In this embodiment, the pulling grip housing 20 is comprised of a first housing portion 22 that is configured to mate with a second housing portion 24. An internal cavity 26 is formed inside the pulling grip housing 20 when the first housing portion 22 is mated with the second housing portion 24. The internal cavity 26 is provided to receive the furcation plug 16 for pulling the fiber optic cable 12 when the pulling grip housing 20 is secured to the pulling grip sleeve 18. The first housing portion 22 is mated to the second housing portion 24 via protrusions 28 and grooves 30 disposed within a top portion 32 of the second housing portion 24. The first housing portion 22 contains complementary grooves and protrusions (not shown) that connect to the protrusions 28 and grooves 30 in the second housing portion 24, respectively, when the first housing portion 22 is disposed over top the second housing portion 22 and the complementary protrusions and complementary grooves are aligned. In other embodiments, the first housing portion 22 may be hingedly attached to the second housing portion 24 so that the housing portions 22, 24 are not dislocated from other as well.

As further illustrated in FIG. 1, both the first housing portion 22 and the second housing portion 24 of the pulling grip housing 20 comprise first ends 34, 37, respectively, and second ends 36, 38, respectively. When the first housing portion 22 is mated to the second housing portion 24, the first ends 34, 37 fit together to define a first opening 39 in the pulling grip housing 20. The second ends 36, 38 fit together to define a second opening 40 in the pulling grip housing 20 opposite from the first ends 34, 37. The internal cavity 26 is formed by internal compartments 41, 43 disposed within the first housing portion 22 and the second housing portion 24, respectively. The furcation plug 16 is received in the pulling grip housing 20 such that it is disposed in the internal cavity 26 and in the internal compartments 41, 43 when the first housing portion 22 is mated to the second housing portion 24. As a result, the fiber optic cable 12 extends through the first opening 39, and the furcated legs 14 extend out of the second opening 40 and into the pulling grip sleeve 18 when secured to the pulling grip housing 20. The pulling grip sleeve 18 protects the furcated legs 14 from being damaged during the pulling of the fiber optic assembly 11. The pulling grip sleeve 18 may be provided to receive one or more furcated legs 14 that are any suitable shape and/or size. By way of example, furcated legs 14 may have diameters that include, without limitation, 900 micrometers (μm), 1.65 millimeters (mm), 2.0 mm, 2.4 mm, and 2.9 mm or non-round shapes for ribbons or the like.

Figure 2:
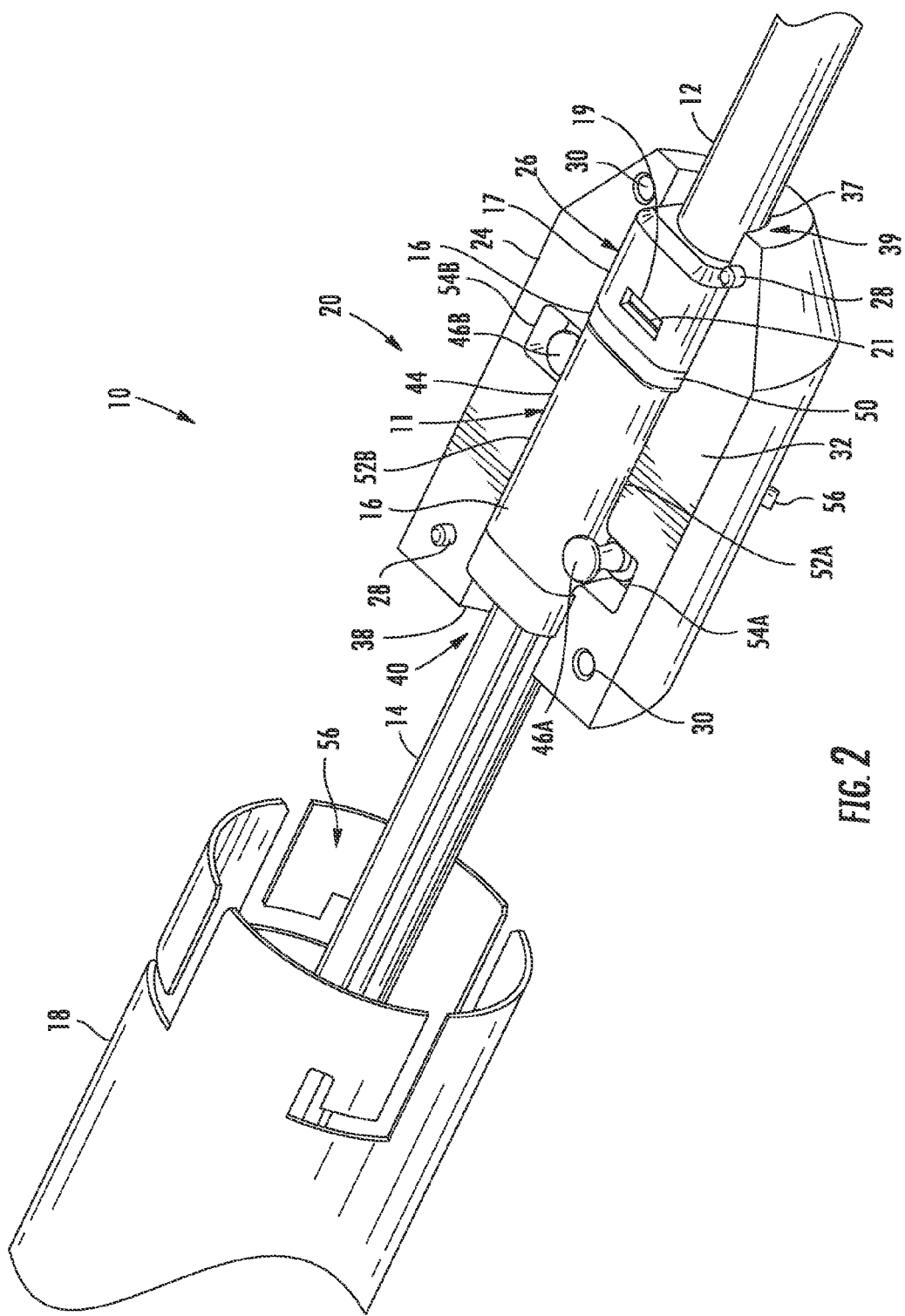
FIG. 2 is a close-up perspective view of the fiber optic assembly of FIG. 1 inserted into an internal compartment of the pulling grip housing.

As illustrated in FIG. 2, the furcation plug 16 is inserted into the pulling grip housing 20, and more particularly, the internal cavity 26 of the second housing portion 24 when being prepared to be pulled by the pulling grip 10. As will be described in more detail below, after the furcation plug 16 is inserted into the internal cavity 26, the first housing portion 22 is mated on top of the second housing portion 24 to secure the furcation plug 16 inside the pulling grip housing 20. The pulling grip housing 20 is then secured to the pulling grip sleeve 18, wherein the pulling grip sleeve 18 can be pulled to to install the fiber optic cable 12 and/or fiber optic assembly 11.

The second housing portion 24 and its internal cavity 26 also provide for receiving an attachment feature of the furcation plug 16. The attachment feature is provided in the form of an attachment bracket 44 in the fiber optic assembly 11 as illustrated in FIGS. 1 and 2. As discussed in co-pending U.S. patent application titled "Optical Fiber Furcation Devices and Methods Having Anti-Rotation Feature" previously referenced above, the attachment bracket 44 is configured to fit around the furcation plug 16. The attachment bracket 44 facilitates mounting of the furcation plug 16 to a mounting surface in fiber optic equipment (not shown) when pulling is completed and the fiber optic assembly 11 is installed in the fiber optic equipment. As illustrated in FIG. 1, the attachment bracket 44 contains attachment devices in the form of plungers 46A, 46B disposed in attachment platforms 48A, 48B secured to the attachment bracket 44. Thus, when the furcation plug 16 is mounted on a mounting surface, the attachment bracket 44 can be disposed around the furcation body 16 and the plungers 46A, 46B inserted into apertures in the mounting surface to secure the furcation plug 16 to the mounting surface.

In this regard, the internal cavity 26 of the pulling grip housing 20 is also designed to receive the attachment bracket 44 and the plungers 46A, 46B disposed with the attachment platforms 48A, 48B of the attachment bracket 44 when receiving the furcation plug 16. The internal cavity 26 is molded into the pulling grip housing 20 of similar complementary geometry as the furcation plug 16 with the attachment bracket 44 and the plungers 46A, 46B disposed in the attachment platforms 48A, 48B of the attachment bracket 44. Further, as illustrated in FIGS. 1 and 2, a notched portion 50 disposed in the furcation plug 16 and configured to receive the attachment bracket 44 fits between protruding surfaces 52A, 52B disposed within the internal cavity 26. The internal cavity 26 also contains portions 54A, 54B to also receive the attachment platforms 48A, 48B of the attachment bracket 44.

Providing for the pulling grip housing 20 to retain both the furcation plug 16 as well as its attachment feature(s) may provide several features. First, it can reduce the likelihood of the attachment bracket 44 being separated and/or lost from the furcation plug 16 during pulling of the fiber optic assembly 11. Further, including the attachment bracket 44 in the pulling grip housing 20 can assist in resisting rotational forces placed on the fiber optic cable 12 as a result of rotational forces applied to the pulling grip 10. For example, the internal cavity 26 provides for receiving the attachment bracket 44 with its attachment platforms 48A, 48B and plungers 46A, 46B, wherein one plunger 46A is disposed on an opposite side and opposite end of the furcation plug 16 from the other plunger 46B. This arrangement increases the surface area contact between the furcation plug 16 and the pulling grip housing 20. Increasing the surface area increases the torque force required to rotate the furcation plug 16 and thus the fiber optic assembly 11. Thus, when a rotational force is placed on the pulling grip 10, an increased amount of torque is required to translate the rotational force onto the fiber optic cable 12. In this regard, providing a pulling grip housing 20 that can receive an attachment feature for the furcation plug 16 provides an anti-rotation feature. Additionally, other suitable furcation plugs having at least one planar surface may also provide an anti-rotation feature. Additionally, although the pulling grip housing is shown accommodating an attachment bracket this is not necessary; in other words, the pulling grip housing can simply fit a portion of the furcation plug therein. Moreover, the pulling grip housing can be designed to accommodate any suitable shape for the furcation plug such as round, square, hexagonal, round with a flat-side, triangular, etc.

Once the furcation plug 16 and any attachment feature, such as the attachment bracket 44, and any attachment device (s), such as the plungers 46A, 46B, are disposed in the internal cavity 26 of the pulling grip housing 20, the pulling grip housing 20 can be closed before being secured to the pulling grip sleeve 18. In the example of FIGS. 1 and 2, the pulling grip housing 20 is closed by mating the first housing portion 22 with the second housing portion 24 with the furcation plug 16 and any of its attachments disposed inside the internal cavity 26. As previously discussed, the first housing portion 22 is mated to the second housing portion 24 via protrusions 28 and grooves 30 disposed within the top portion 32 of the second housing portion 24. The first housing portion 22 contains complementary grooves and protrusions (not shown) that couple to the protrusions 28 and grooves 30 in the second housing portion 24, respectfully. However, any other attachment device or means can be used.

Figure 3:
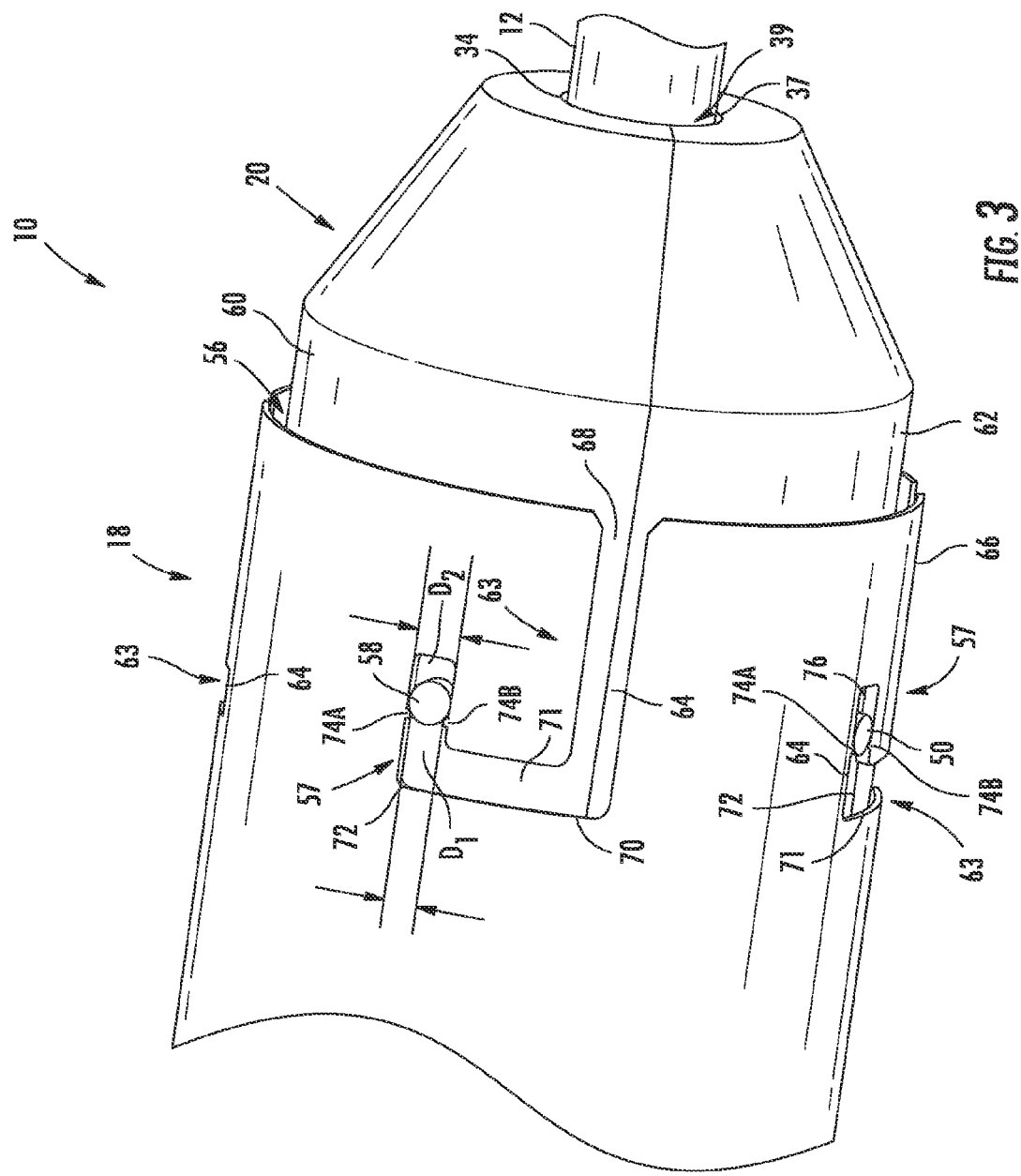
FIG. 3 is a close-up perspective view of the pulling grip housing secured to the pulling grip sleeve of the pulling grip of FIG. 1.

After the furcation plug 16 and attachment bracket 44 are secured inside the pulling grip housing 20, the pulling grip housing 20 can be inserted and received into the pulling grip sleeve 18 as illustrated in FIG. 3. In this manner, a pulling force applied to the pulling grip sleeve 18 will transfer the tensile load to the fiber optic cable 12. FIG. 3 illustrates a close-up view of the pulling grip housing 20 inserted and received into the internal chamber 56 (illustrated in FIG. 2) of the pulling grip sleeve 18 which is annular-shaped. The pulling grip housing 20 is secured to the pulling grip sleeve 18 via locking features disposed in both the pulling grip housing 20 and pulling grip sleeve 18 that are configured to cooperate with each other. In this regard, and as illustrated in FIGS. 2-3, housing locking features 57 in the form of protrusions 58 are disposed in the pulling grip housing 20. The pulling grip housing 20 includes an outer body 60 of the first housing portion 22 and an outer body 62 of the second housing portion 24. One or more protrusions 58 can be provided in one or more of the outer bodies 60, 62. Each protrusion 58 is configured to be inserted into a sleeve locking feature 63 in the form of a locking channel 64 disposed in an outer body 66 of the pulling grip sleeve 18. A plurality of locking channels 64 may be provided and disposed within the pulling grip sleeve 18 to cooperate with a plurality of protrusions 58 disposed in the outer bodies 60, 62 of the pulling grip housing 20.

As illustrated in FIG. 3, the locking channels 64 are provided in the form of U-shaped channels, although any other form of channels may be provided such as J-shaped channels or the like. Additionally, although locking channels 64 are shown extending entirely through the sleeve wall other embodiments can have the locking channels 64 within the sleeve wall (i.e., not fully extending through the sleeve wall), which improves the hoop strength of the pulling grip sleeve. The pulling grip housing 20 is inserted into the internal chamber 56 of the pulling grip sleeve 18 such that the protrusions 58 line up with openings 68 of the locking channels 64. The pulling grip housing 20 is then pushed forward into the internal chamber 56 of the pulling grip sleeve 18 until the protrusions 58 reach a first section 70 of the locking channels 64. To interlock the pulling grip housing 20 with the pulling grip sleeve 18, the pulling grip housing 20 is rotated clockwise through a second portion 71 of the locking channel 64, wherein the pulling grip housing 20 and its protrusion 58 are then pulled forward in a third portion 72 of the locking channel 64. Opposing protrusions 74A, 74B are disposed within the third portion 72 of the locking channel 64 such that the internal diameter $D_1$ along the axis of the protrusions 74A, 74B, is less than the outer diameter $D_2$ of the protrusion 58. In this manner, when the pulling grip housing 20 is pulled forward when the protrusions 58 are in the third portion 72 of the locking channel 64, the protrusions 58 slip past the protrusions 74A, 74B at an end portion 76 of the locking channel 64 to secure the pulling grip housing 20 to the pulling grip sleeve 18 in a tension fit. In this arrangement, the pulling grip housing 20 can also easily be removed from the pulling grip sleeve 18 at any time desired by pushing the pulling grip housing 20 into the pulling grip sleeve 18 such that the force causes the protrusions 58 to slip past the protrusions 74A, 74B in the third portion 72 of the locking channel 64 to unlock the pulling grip housing 20 from the pulling grip sleeve 18. Thus, in this arrangement, no fasteners are required to lock and release the pulling grip housing 20 from the pulling grip sleeve 18.

Figure 4A:
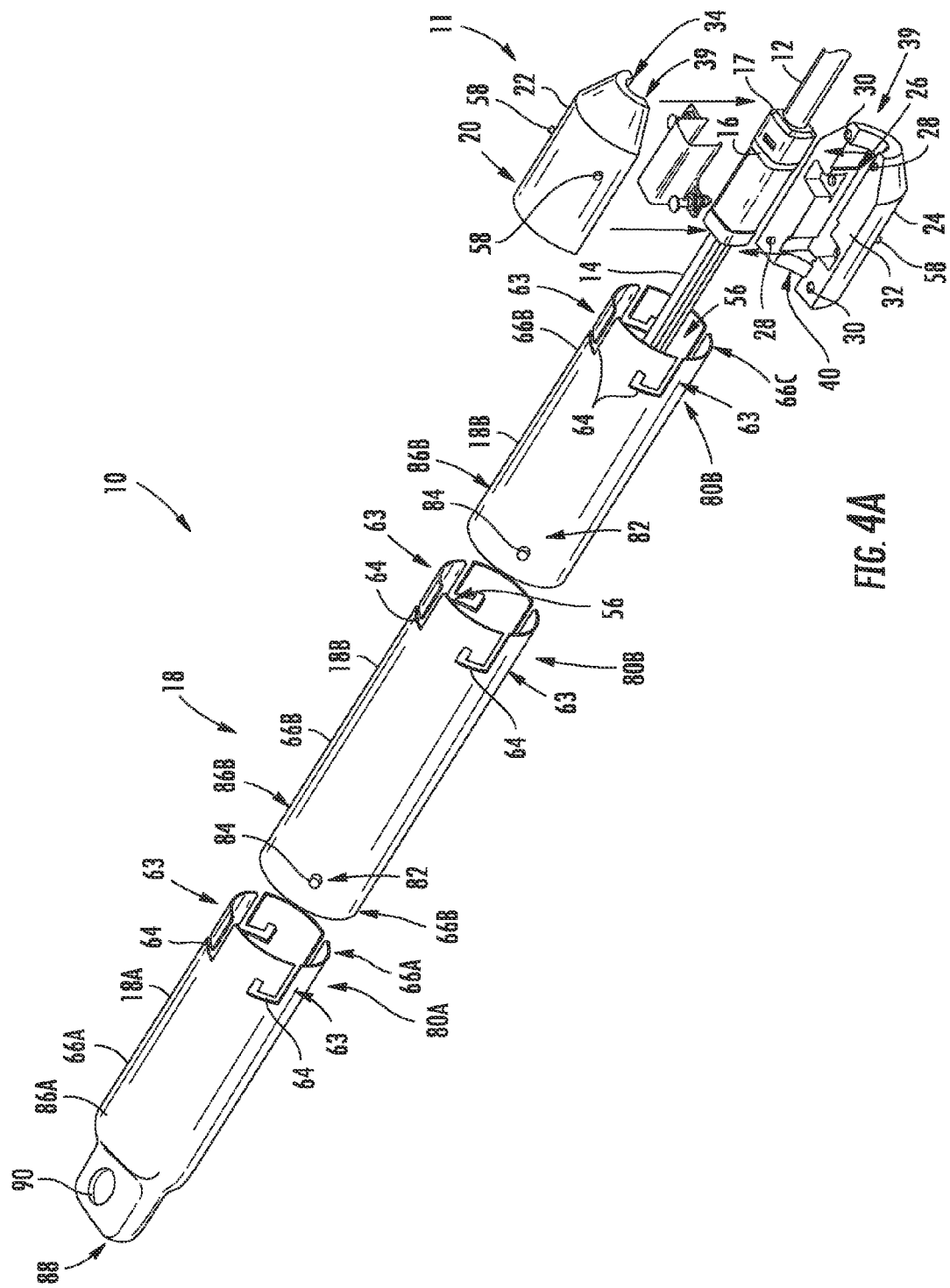
FIG. 4A is a perspective exploded view of the pulling grip of FIG. 1 illustrating the pulling grip sleeve comprised of a plurality of removably attachable pulling grip sleeve sections.

FIG. 4A illustrates an exploded perspective view of the pulling grip 10 and one embodiment of the pulling grip sleeve 18. As illustrated therein, the pulling grip sleeve 18 may be provided in a plurality of removably attachable pulling grip sleeve sections 18A, 18B. Alternatively, the pulling grip sleeve may be provided as single section 18, as illustrated in FIG. 4B. Providing the pulling grip sleeve 18 into the plurality of pulling grip sleeve sections 18A, 18B, as illustrated in FIG. 4A, may provide for more convenient shipping or storage of the pulling grip sleeve 18 since the pulling grip sleeve 18 can be broken down into smaller pulling grip sections 18A, 18B. As illustrated in FIG. 4A, one or more pulling grip sleeve sections 18B are secured together with the sleeve locking feature 63 disposed in first ends 80A, 80B of the pulling grip sleeves 18A, 18B. The sleeve locking feature 63 is configured and operates as previously described. The pulling grip sleeve sections 18B also contain a sleeve locking feature 82 in the form of protrusions 84 disposed on the outer body 66B on a second end 86B opposite the first end 80B. The protrusions 84 are configured to interlock with locking channels 64 disposed in the outer body 66A, 66B of the front end 80A, 80B of an adjacent pulling grip sleeve section 18A, 18B. The pulling grip sleeve section 18B adjacent the pulling grip housing 20 is configured to interlock with the protrusions 58 disposed in the pulling grip housing 20 as previously described. In this manner, the pulling grip sleeve sections 18A, 18B are removable from each other unlocking the protrusions 58 from the locking channels 64.

Figure 5A:
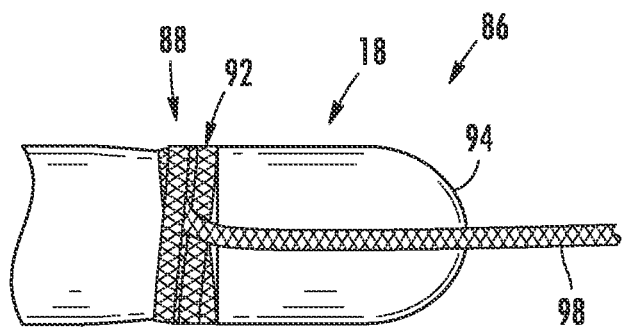
FIGS. 5A-5C are perspective views of alternate pulling grip sleeve end portions having alternate pulling features, respectively.
Figure 5B:
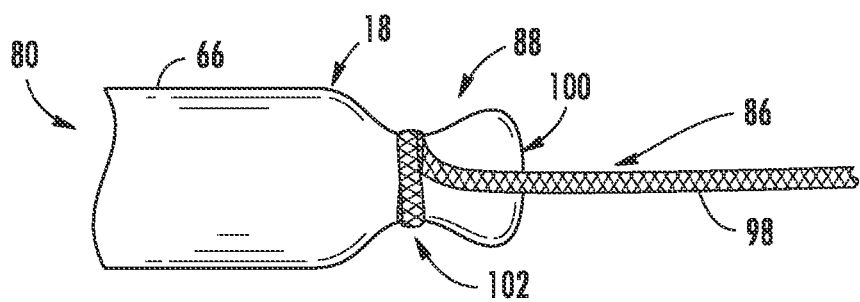
Figure 5C:
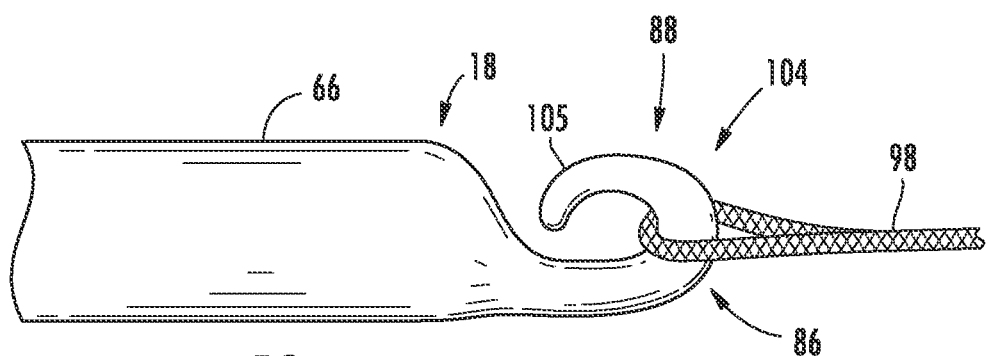

The pulling grip sleeve section 18A does not contain protrusions 84, because it is located on the end of the pulling grip sleeve 18 and therefore does not need to be mated with any other pulling grip sleeve sections 18B. However, a pulling feature 88 is provided on the second end 86A of the pulling grip sleeve section 18A to allow a rope, string, or other device to attach to the pulling grip sleeve section 18A to pull the entire pulling grip sleeve 18 when assembled and thus the fiber optic cable 12 as desired. In this example, the pulling feature 88 is provided in the form of a pulling eye 90; however, other variations can be provided. FIGS. 5A-5C illustrate alternative pulling features 88. FIG. 5A illustrates a collar 92 disposed in the pulling grip sleeve 18 as the pulling feature 88. The collar 92 is formed by provided an end section 94 at the second end 86 having a larger outer diameter than a second section 96 attached to the end section 94. In this manner, the collar 92 is formed where the end section 94 attaches to the second section 96. A rope or other pulling device 98 is looped tight below the collar 92 such that inner diameter of the pulling device 98 is smaller than the outer diameter of the end section 94. In this manner, when the pulling device 98 is pulled, the pulling device 98 abuts against the collar 92 to prevent the pulling device 98 from slipping over the collar 92, thus applying a pulling force on the pulling grip sleeve 18.

FIGS. 5B and 5C illustrate alternate pulling features 88. FIG. 5B illustrates a neck down 100 pulling feature. The neck down 100 is formed by provide a smaller diameter section 102 in the outer body 66 of the pulling grip sleeve 18 between a first end 80 and a second end 86 having larger outer diameters than the smaller diameter section 102. In this manner, the neck down 100 is formed in the pulling grip sleeve 18. A rope or other pulling device 98 is looped tight around the smaller diameter section 102 such that inner diameter of the pulling device 98 is smaller than the outer diameter of the second end 86. In this manner, when pulling device 98 is pulled, the pulling device 98 is pulled against the second end 86 to pull the pulling grip sleeve 18. FIG. 5C illustrates a pulling loop 104 pulling feature. The pulling loop 104 is formed by providing a loop section 105 in the second end 86 of the outer body 66 of the pulling grip sleeve 18. A rope or other pulling device 98 is looped inside the pulling loop 104. In this manner, when the pulling device 98 is pulled, the pulling loop 104 and the pulling grip sleeve 18 are pulled.

Figure 6:
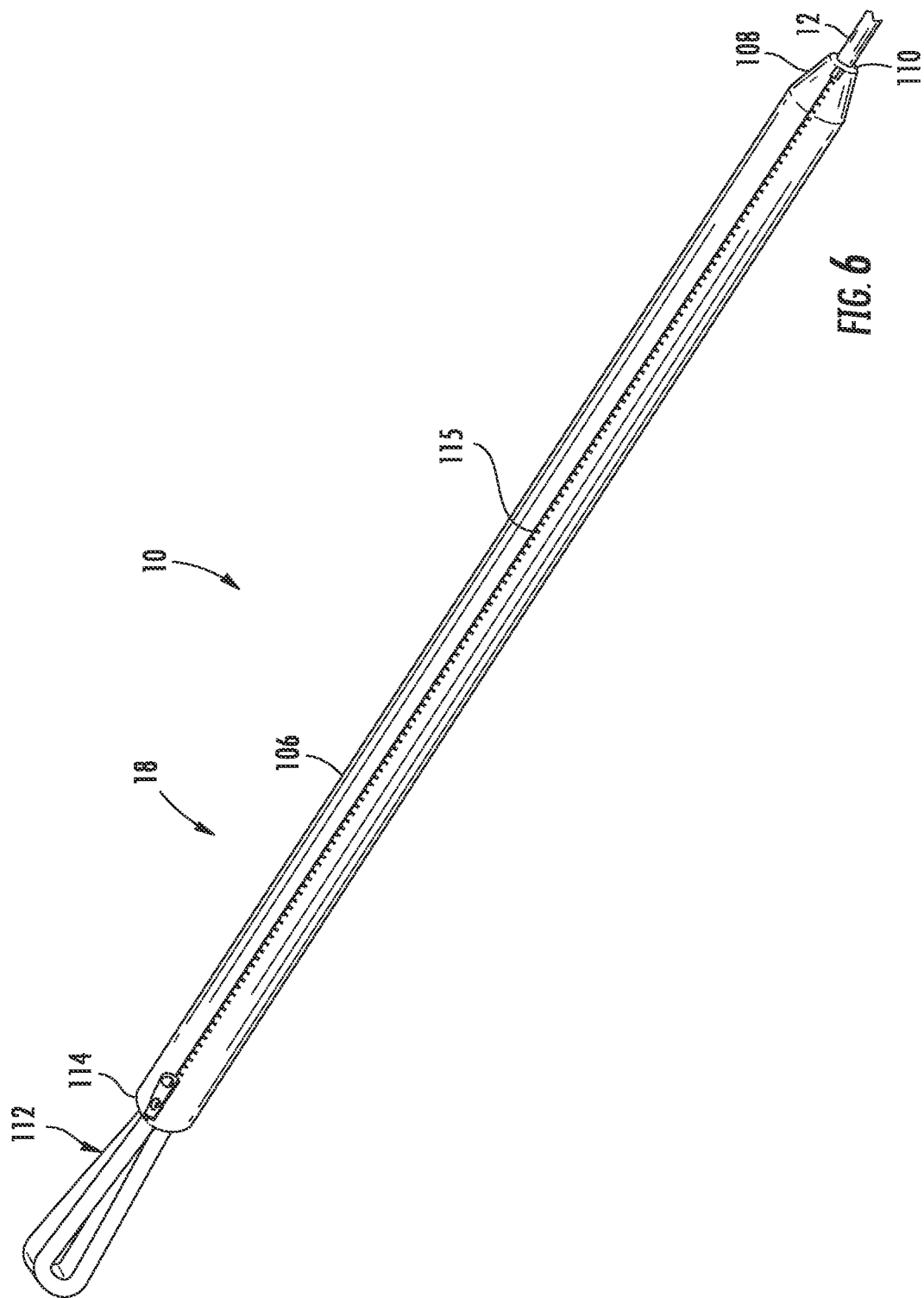
FIG. 6 is a perspective view of the pulling grip of FIG. 1 inserted into a pulling sock.

As illustrated in FIG. 6, a pulling sock 106 may also be provided and placed over the pulling grip sleeve 18 to further facilitate pulling of the pulling grip 10. As illustrated in FIG. 6, the pulling sock 106 is disposed over the pulling grip sleeve 18 disposed therein. The pulling sock 106 comprises a front conical portion 108 that is shaped essentially like the front portion of the pulling grip housing 20 when the first housing portion 22 is mated to the second housing portion 24. The pulling sock 106 contains an opening 110 to allow the fiber optic cable 12 to pass therethrough while retaining the pulling grip housing 20 inside the pulling sock 106. A pulling sock loop 112 is disposed on a second end 114 of the pulling sock 106 to facilitate pulling of the pulling grip sleeve 18 and thus the fiber optic cable 12. The pulling sock 106 may comprise a zipper 115 or other attachment means (not shown) such that it can be opened and disposed around the pulling grip sleeve 18 and the pulling grip housing 20. The pulling sock 106 may be constructed out of any material, including but not limited to a polymer, metal, filament, and provided in any form, including but not limited to a solid material, mesh, and composite.

FIGS. 7A and 7B illustrate an alternate exemplary pulling grip 10'. The pulling grip 10' is similar to the pulling grip 10 of FIGS. 1-4B. However, an alternate pulling grip housing 20' is provided that does not provide for the an attachment feature or securing devices for the furcation plug 16' to be cradled along with a furcation plug 16' or other furcation body. More specifically, internal compartments 41', 43' of the pulling grip housing 20' do not include compartments for the attachment bracket 44 and the plungers 46A, 46B for the furcation plug 16 in FIGS. 1-4B. Further, a pulling grip sleeve 18 is provided as a one-piece mold similar to the pulling grip sleeve shown in FIG. 4B. The pulling sock 106 provided in FIG. 6 may also be employed with the pulling grip 10' to facilitate pulling of the fiber optic cable 22. Notwithstanding these differences, the previous descriptions of the pulling grip housing 20 and pulling grip sleeves 18 in FIGS. 1-4B are applicable to the pulling grip 10' in FIGS. 7A and 7B. Similar elements are noted with the same element numbers appended with a single quotation mark ('). Common elements are noted with the same element numbers without a single quotation mark (').

FIGS. 8-11 illustrate an alternate exemplary pulling grip 120 that may be employed to pull a fiber optic assembly 121. As illustrated in FIG. 8, the pulling grip 120 is shown as receiving the fiber optic assembly 121. The pulling grip 120 is designed to pull the fiber optic assembly 121, such as during an installation, without damaging or minimizing the risk of damage to the fiber optic assembly 121. Like the fiber optic assembly 11 of FIG. 1, the fiber optic assembly 121 of FIG. 8 is comprised of a fiber optic cable 122 furcated into one or more furcated legs 124 inside a furcation plug 126 receiving the fiber optic cable 122. As discussed in more detail below, the pulling grip 120 includes a one-piece pulling grip sleeve 128 having an annular cross-section 129 that receives an end portion of the fiber optic assembly 121 and the furcation plug 126 and the furcated legs 124. In this embodiment, the pulling grip sleeve 128 does not close around the fiber optic assembly 121 or directly receive the furcation plug 126. The pulling grip sleeve 128 receives a portion of the pulling grip housing 130 that is disposed about and closed around the furcation plug 126. The pulling grip housing 130 receives and secures the furcation plug 126. In this manner, when the pulling grip sleeve 128 is pulled, the pulling force is translated to the pulling grip housing 130, which then translates the pulling force to the furcation plug 126 where the strength elements of the fiber optic cable 122 may be located.

In this embodiment, the pulling grip housing 130 is comprised of a first housing portion 132 that is configured to mate with a second housing portion 134. An internal cavity 136 is formed inside the pulling grip housing 130 when the first housing portion 132 is mated with the second housing portion 134. The internal cavity 136 is provided to receive the furcation plug 126 for pulling the fiber optic cable 122 when the pulling grip housing 130 is secured to the pulling grip sleeve 128. The first housing portion 132 is mated to the second housing portion 134 via protrusions 138 and grooves 140 disposed within a top portion 142 of the second housing portion 134. The first housing portion 132 contains complementary grooves and protrusions (not shown) that connect to the protrusions 138 and grooves 140 in the second housing portion 134, respectively, when the first housing portion 132 is disposed over top the second housing portion 134 and the complementary protrusions and complementary grooves are aligned.

As further illustrated in FIG. 8, both the first housing portion 132 and the second housing portion 134 of the pulling grip housing 130 comprise first ends 144, 146, respectively, and second ends 147, 148, respectively. When the first housing portion 132 is mated to the second housing portion 134, the first ends 144, 146 fit together to define a first opening 149 in the pulling grip housing 130. The second ends 147, 148 fit together to define a second opening 150 in the pulling grip housing 130 opposite from the first ends 144, 146. An internal cavity 152 disposed within the pulling grip housing 130 is also formed when the first housing portion 132 is mated with the second housing portion 134. The internal cavity 152 is formed by internal compartments 153, 154 disposed within the first housing portion 132 and the second housing portion 134, respectively. The furcation plug 126 is received in the pulling grip housing 130 such that it is disposed in the internal cavity 152 and in the internal compartments 153, 154 when the first housing portion 132 is mated to the second housing portion 134. As a result, the fiber optic cable 122 extends through the first opening 149, and the furcated legs 124 extend out of the second opening 150 and into the pulling grip sleeve 128 when secured to the pulling grip housing 130.

As illustrated in FIG. 9, the furcation plug 126 is inserted into the pulling grip housing 130, and more particularly, the internal compartment 154 of the second housing portion 134 when being prepared to be pulled by the pulling grip 120. As will be described in more detail below, after the furcation plug 126 is inserted into the internal compartment 154, the first housing portion 132 is mated on top of the second housing portion 134 to secure the furcation plug 126 inside the pulling grip housing 130. The pulling grip housing 130 is then secured to the pulling grip sleeve 128, wherein the pulling grip sleeve 128 can be pulled to pull the fiber optic cable 122.

The second housing portion 134 and its internal compartment 154 also provide for receiving an attachment feature 156 of the furcation plug 126. The attachment feature 156 is provided in the form of attachment platforms 158A, 158B in the fiber optic assembly 121 as illustrated in FIGS. 8 and 9. As discussed in co-pending U.S. patent application titled "Optical Fiber Furcation Devices and Methods Having Anti-Rotation Feature" previously referenced above, the attachment platforms 158A, 158B are provided in the furcation plug 126 as a one-piece mold as opposed to a separate attachment feature, such as the attachment bracket 44 in the fiber optic assembly 11 of FIG. 1. The attachment platforms 158A, 158B facilitate mounting of the furcation plug 126 to a mounting surface in fiber optic equipment (not shown) when pulling is completed and the fiber optic assembly 121 is installed in the fiber optic equipment. As illustrated in FIG. 8, attachment devices in the form of plungers 159A, 159B are disposed in the attachment platforms 158A, 158B of the furcation plug 126. Thus, when the furcation plug 126 is mounted on a mounting surface, the attachment platforms 158A, 158B abut against the mounting surface. The plungers 159A, 159B insert into apertures in the mounting surface to secure the furcation plug 126 to the mounting surface.

In this regard, the internal cavity 152 of the pulling grip housing 130 is also designed to receive the attachment platforms 158A, 158B and the plungers 159A, 159B disposed in the attachment platforms 158A, 158B of the furcation plug 126 when receiving the furcation plug 126. The internal cavity 152 is provided of similar geometry as the furcation plug 126 with the attachment platforms 158A, 158B and the plungers 159A, 159B disposed in the attachment platforms 158A, 158B. Providing for the pulling grip housing 130 to retain the furcation plug 126 as well as its attachment feature(s) 156 and/or attachment devices may assist in resisting rotational forces placed on the fiber optic cable 122 as a result of rotational forces applied to the pulling grip 120. For example, the internal compartment 154 provides for receiving the attachment platforms 158A, 158B and the plungers 159A, 159B, wherein one plunger 159A is disposed on an opposite side and opposite end of the furcation plug 126 from the other plunger 159B. This arrangement increases the surface area contact between the furcation plug 126 and the pulling grip housing 130. Increasing the surface area increases the torque force required to rotate the furcation plug 126 and thus the fiber optic assembly 121. Thus, when a rotational force is placed on the pulling grip 120, an increased amount of torque is required to translate the rotational force onto the fiber optic cable 122. In this regard, providing a pulling grip housing 130 that can receive an attachment feature for the furcation plug 126 provides an anti-rotation feature.

Once the furcation plug 126 and any attachment feature, such as the attachment platforms 158A, 158B, and any attachment device(s), such as the plungers 159A, 159B, are disposed in the internal cavity 152 of the pulling grip housing 130, the pulling grip housing 130 can be closed before being secured to the pulling grip sleeve 128. In the example of FIGS. 8 and 9, the pulling grip housing 130 is closed by mating the first housing portion 132 with the second housing portion 134 with the furcation plug 126 and any of its attachments disposed inside the internal cavity 152. As previously discussed, the first housing portion 132 is mated to the second housing portion 134 via protrusions 138 and grooves 140 disposed within the top portion 142 of the second housing portion 134. The first housing portion 132 contains complementary grooves and protrusions (not shown) that couple to the protrusions 138 and grooves 140 in the second housing portion 134, respectively. However, any other attachment device or means can be used.

After the furcation plug 126 and attachment platforms 158A, 158B and plungers 159A, 159B are secured inside the pulling grip housing 130, the pulling grip housing 130 can be inserted into the pulling grip sleeve 128. In this manner, a pulling force applied to the pulling grip sleeve 128 will transfer the tensile load to the fiber optic cable 122. FIG. 10 illustrates a perspective view of the pulling grip housing 130 inserted into an internal chamber 166 (illustrated in FIG. 9) of the pulling grip sleeve 128. The pulling grip housing 130 is secured to the pulling grip sleeve 128 via locking features disposed in both the pulling grip housing 130 and pulling grip sleeve 128 that are configured to cooperate with each other just as provided in the pulling grip 130 and illustrated in FIG. 10. In this regard, and as illustrated in FIGS. 9-10, housing locking features 167 in the form of protrusions 168 are disposed in the pulling grip housing 130. The pulling grip housing 130 includes an outer body 170 of the first housing portion 132 and an outer body 172 of the second housing portion 134. One or more protrusions 168 can be provided in one of the outer bodies 170, 172. Each protrusion 168 is configured to be inserted into a sleeve locking feature 173 in the form of one or more locking channels 174 disposed in an outer body 176 of the pulling grip sleeve 128. A plurality of locking channels 174 may be provided and disposed within the pulling grip sleeve 128 to cooperate with a plurality of protrusions 168 disposed in the outer bodies 170, 172 of the pulling grip housing 130.

As illustrated in FIG. 10, the locking channels 174 are provided in the form of U-shaped channels, although any other form of channels may be provided. The pulling grip housing 130 is inserted into the internal chamber 166 of the pulling grip sleeve 128 such that the protrusions 168 line up with openings 178 of the locking channels 174. The pulling grip housing 130 is then pushed forward into the internal chamber 166 of the pulling grip sleeve 128 until the protrusions 168 reach a first portion 180 of the locking channels 174. To interlock the pulling grip housing 130 with the pulling grip sleeve 128, the pulling grip housing 130 is rotated clockwise through a second portion 181 of the locking channel 174, wherein the pulling grip housing 130 and its protrusion 168 are then pulled forward in a third portion 182 of the locking channel 174. Opposing protrusions 184A, 184B are disposed within the third portion 182 of the locking channel 174 such that the internal diameter $D_3$ along the axis of the protrusions 184A, 184B, is less than the outer diameter $D_4$ of the protrusion 168. In this manner, when the pulling grip housing 130 is pulled forward when the protrusions 168 are in the third portion 182 of the locking channel 174, the protrusions 168 slip past the protrusions 184A, 184B at an end portion 186 of the locking channel 174 to secure the pulling grip housing 130 to the pulling grip sleeve 128 in a tension fit. In this arrangement, the pulling grip housing 130 can also easily be removed from the pulling grip sleeve 128 at any time desired by pushing the pulling grip housing 130 into the pulling grip sleeve 128 such that the force causes the protrusions 168 to slip past the protrusions 164A, 164B in the third portion 182 of the locking channel 174 to unlock the pulling grip housing 130 from the pulling grip sleeve 128. Thus, in this arrangement, no fasteners are required to lock and release the pulling grip housing 130 from the pulling grip sleeve 128.

Figure 11:
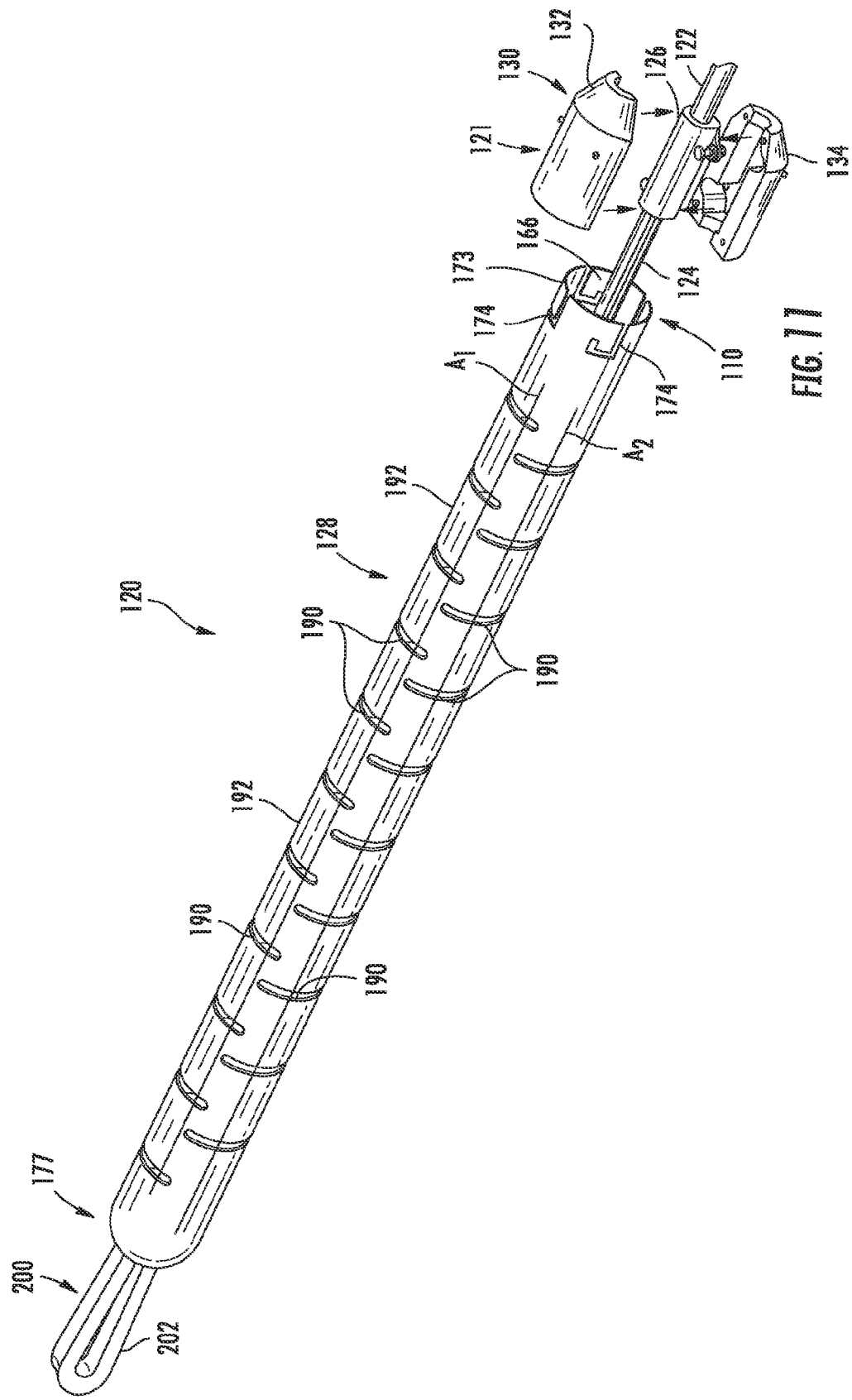
FIG. 11 is a perspective exploded view of the pulling grip of FIG. 8.
Figure 12:
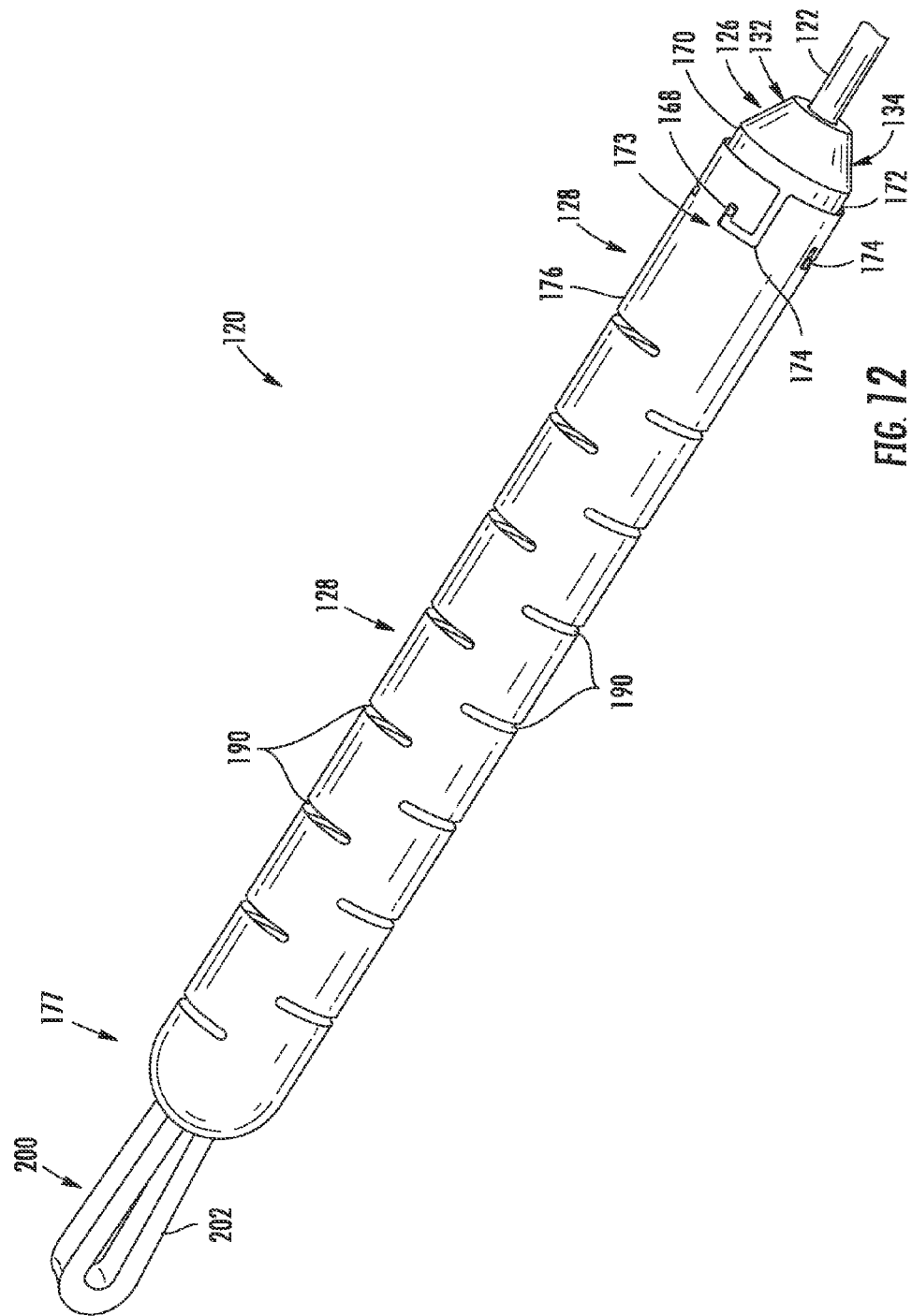
FIG. 12 is a perspective view of the pulling grip housing secured to the pulling grip sleeve of the pulling grip of FIG. 8.

FIG. 11 illustrates an exploded perspective view of the pulling grip 120 and one embodiment of the pulling grip sleeve 128. FIG. 12 illustrates an assembled perspective view of the pulling grip 120 of FIG. 11. As illustrated therein, one or more slots 190 may be disposed within an outer body 192 of the pulling grip sleeve 128. Providing slots 190 provides greater bending flexibility in the pulling grip sleeve 128 without risking breakage. This may be useful if the pulling grip sleeve 128 must be sharply bent when pulling the fiber optic assembly 121. In this embodiment, the slots 190 are located around the circumference of the pulling grip sleeve 128, illustrated as being located along longitudinal axes $A_1$, $A_2$ of the pulling grip sleeve 128 in FIG. 11, so that slots 190 provide flexibility in bending of the pulling grip sleeve 128 no matter which way it is bent.

A pulling feature 200 is provided on a second end 177 of the pulling grip sleeve 128 to allow a rope, string, or other device to attach to the pulling grip sleeve 128 and thus pull the fiber optic cable 122 as desired. In this example, the pulling feature 200 is provided in the form of a pulling loop 202; however, other variations can be provided, including but not limited to the pulling features illustrated in FIGS. 6A-6C and previously described above.

FIGS. 13A-13D illustrate an alternate pulling grip 220 that may also be employed to secure and pull a fiber optic assembly. In this alternate pulling grip 220, a pulling grip housing 222 and a pulling grip sleeve 224 are provided that have a similar design to the pulling grip assemblies 10, 120 in FIGS. 1 and 8, respectively. The pulling grip sleeve 224 has an annular cross-section, as illustrated in FIG. 13D, that receives the pulling grip housing 222, wherein the pulling grip housing 222 is disposed about and closed around a fiber optic assembly. However, the locking features between the pulling grip housing 222 and the pulling grip sleeve 224 in FIGS. 13A-13D are reversed in orientation from the pulling grip assemblies 10, 120 in FIGS. 1 and 8, respectively. In this regard, a housing locking feature 225 is provided in the form of one or more locking channels 226. The locking channels 226 are disposed in an outer body 228 of the pulling grip housing 222 on a second end 230 opposite a first end 231 of the pulling grip housing 222 that receives a fiber optic cable as illustrated in FIGS. 13B and 13C. If the pulling grip housing 222 is comprised of a first housing portion 237 and a second housing portion 239, as provided in the embodiment illustrated in FIGS. 13A-13D, the locking channels 226 can be disposed in both housing portions 237, 239.

As illustrated in FIGS. 13A and 13D, a sleeve locking feature 229 is provided in the form of one or more protrusions 232 disposed inside an internal cavity 233 disposed in an outer body 234 of the pulling grip sleeve 224, as illustrated in FIG. 13D. Each protrusion 232 is configured to cooperate with a locking channel 226 when a first end 235 of the pulling grip sleeve 224 is inserted the second end 230 of the pulling grip housing 222. Each protrusion 232 is inserted into a corresponding locking channel 226 where either the pulling grip sleeve 224 or the pulling grip housing 222 can be rotated about the other to lock and release the pulling grip sleeve 224 with the pulling grip housing 222. Thus, the housing locking feature 225 and the sleeve locking feature 229 operate similar to the locking features the pulling grip assemblies 10, 120 in FIGS. 1 and 8, respectively, except that the locking channels 226 and corresponding protrusions 232 are reversed in orientation in the pulling grip 220 of FIGS. 13A-13D.

Figure 14A:
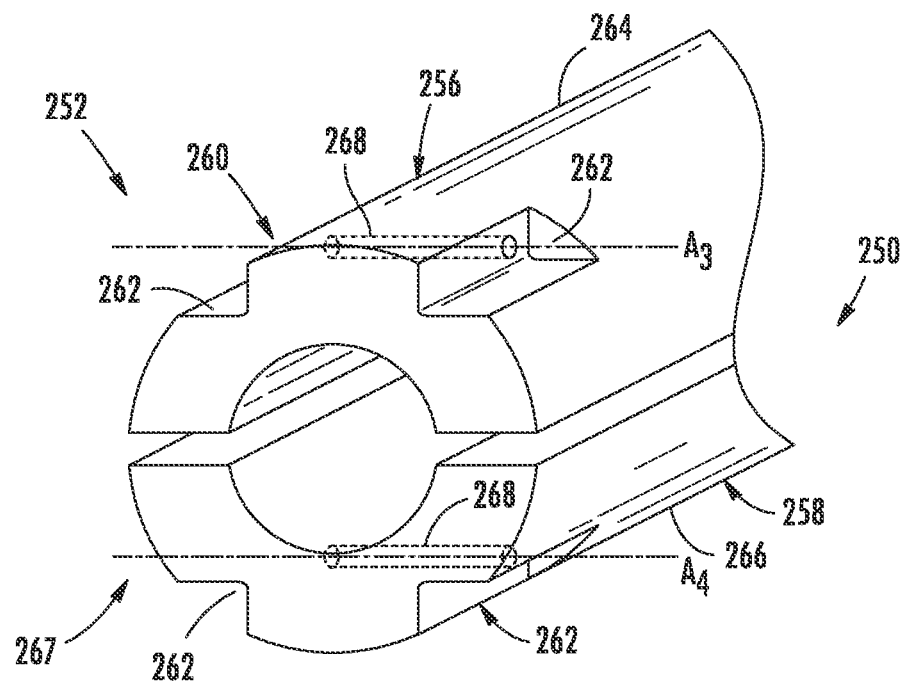
FIGS. 14A and 14B are perspective views of an alternate pulling grip having an alternate housing locking feature and sleeve grip locking feature.

FIGS. 14A-14E illustrate another pulling grip 250 that may be employed to secure and pull a fiber optic assembly. In this embodiment, an alternate locking feature is provided for a pulling grip housing 252 and a pulling grip sleeve 254 in the form of a pin and slot arrangement. As illustrated in perspective view in FIG. 14A, the pulling grip housing 252 is comprised of a first housing portion 256 and a second housing portion 258. A housing locking feature 260 in the form of one or more notched portions 262 is provided in the pulling grip housing 252. The notched portions 262 are formed or disposed in outer bodies 264, 266 of the first housing portion 256 and the second housing portion 258, respectively, and on a first end 267 of the pulling grip housing 252 and provide access to one or more slots 268 disposed between two notched portions 262 as illustrated in FIG. 14A and the side view of the pulling grip housing 252 in FIG. 14C. The slots 268 are formed along longitudinal axes $A_3$, $A_4$ through the pulling grip housing 252 and are configured to receive pins therethrough to secure the pulling grip sleeve 254 to the pulling grip housing 252, as discussed in more detail below. The notched portions 262 provide the first end 267 of the pulling grip housing 252 with a generally cross-shape.

Figure 14B:
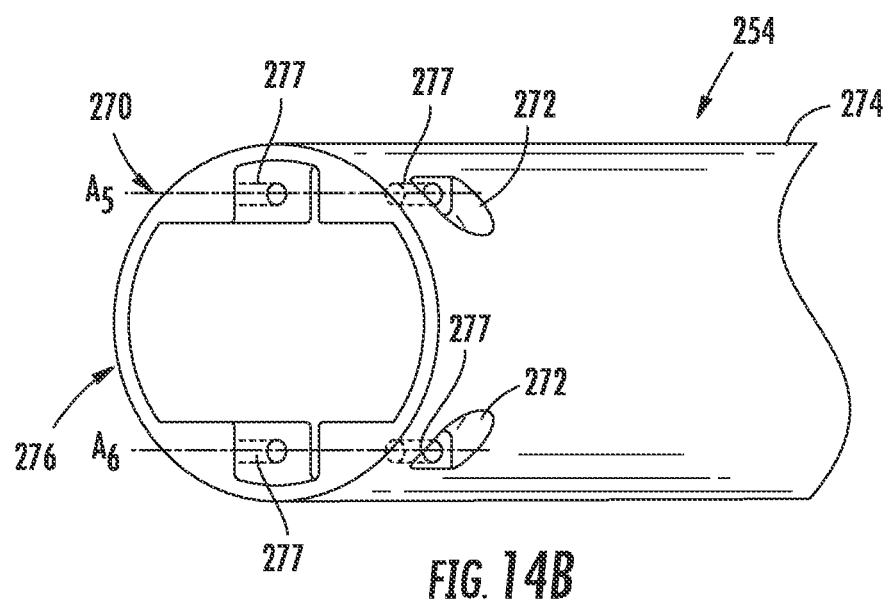
Figure 14C:
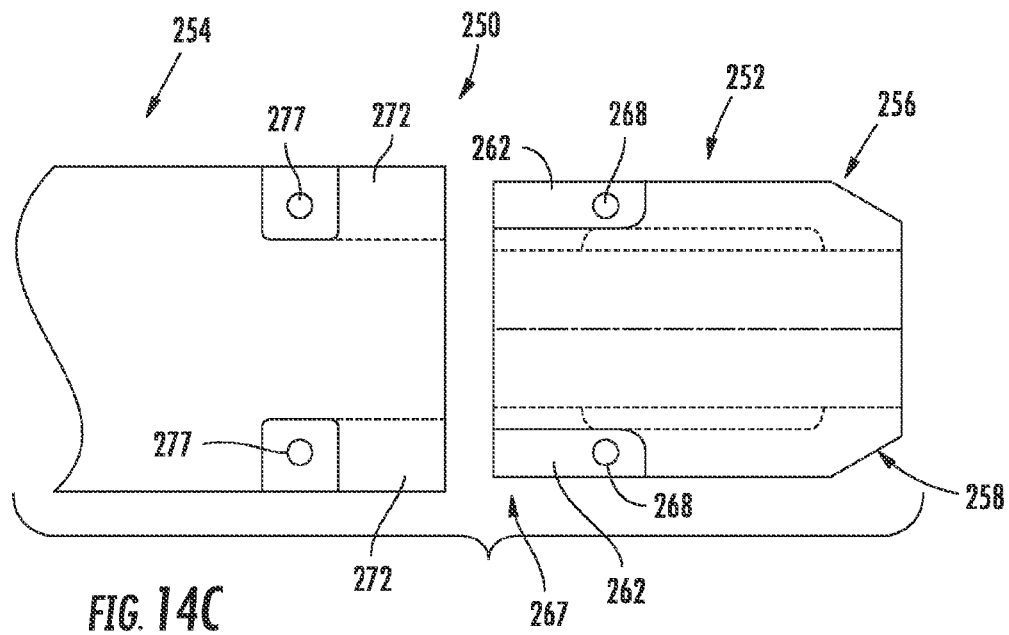
FIG. 14C is a side view of the pulling grip of FIGS. 14A and 14B, respectively, aligned with each other.
Figure 14D:
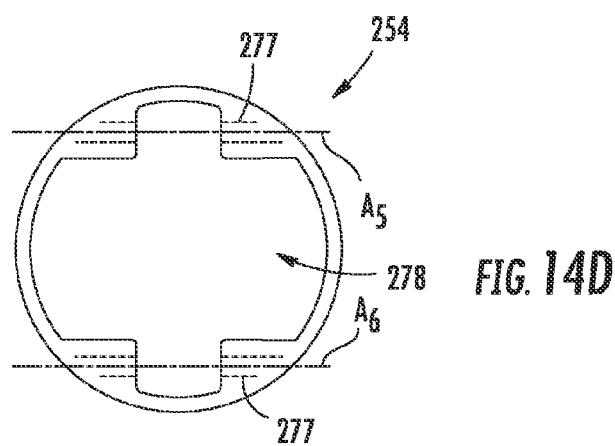
FIG. 14D is a front view of the pulling grip sleeve of FIG. 14B without a received pulling grip housing.
Figure 14E:
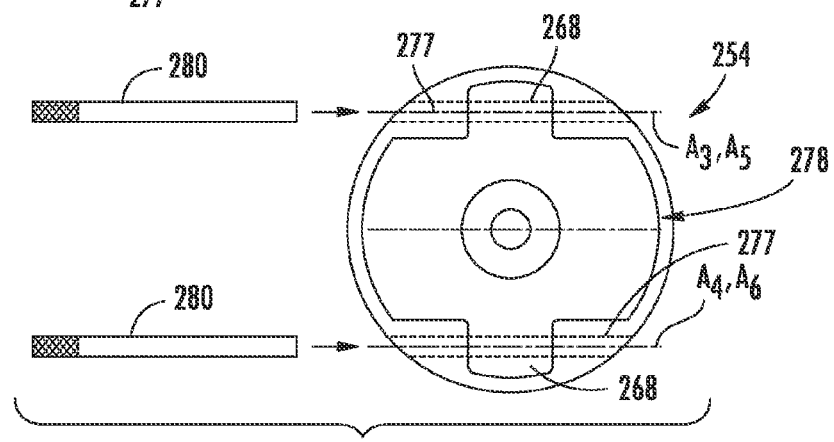
FIG. 14E is a front view of the pulling grip sleeve of FIG. 14B receiving the pulling grip housing of FIG. 14A.

As illustrated in FIG. 14B, a sleeve locking feature 270 in the form of one or more notched portions 272 are provided in an outer body 274 on a first end 276 of the pulling grip sleeve 254. The pulling grip sleeve 254 has an annular cross-section, as illustrated in FIG. 14B, that receives the pulling grip housing 252, wherein the pulling grip housing 252 is disposed about and closed around a fiber optic assembly. Slots 277 are disposed in each notched portion 272 as illustrated in FIGS. 14B and 14D. In this manner, pins can be inserted into the slots 277 along the longitudinal axes $A_5$, $A_6$ of the slots 277 when the pulling grip housing 252 is inserted into the pulling grip sleeve 254. The pulling grip housing 252 is aligned with the pulling grip sleeve 254 in order to insert the pulling grip housing 252 into the pulling grip sleeve 254 as illustrated in FIG. 14C. Thus, when the pulling grip housing 252 is inserted into a complementary cross-shaped opening 278 disposed in the outer body 274 of the pulling grip sleeve 254, as illustrated in FIG. 14E, the slots 277 disposed the pulling grip sleeve 254 are aligned with the slots 268 disposed in the pulling grip housing 252. When aligned, the longitudinal axes $A_3$, $A_4$ of the slots 268 disposed in the pulling grip housing 252 are aligned with the longitudinal axes $A_5$, $A_6$ of the slots 277 disposed in the pulling grip sleeve 254. The pulling grip sleeve 254 can then be secured or locked to the pulling grip housing 252 by inserting pins 280 into the aligned slots 277, 268. The slots 277, 268 and the pins 280 may be threaded in a complementary manner such that the pins 280 screw into the slots 277, 268. Attachment devices other than pins can be used, and such do not have to be threaded.

FIGS. 15A and 15B illustrate another pulling grip 290 that may be employed to pull a fiber optic assembly. In this embodiment, an alternate locking feature is provided for a pulling grip sleeve 292 and a pulling grip housing 294 of the pulling grip 290. As illustrated therein, the pulling grip sleeve 292 has an annular cross-section for receiving the pulling grip housing 294. The pulling grip housing 294 is disposed about and closed around a fiber optic assembly such as the furcation plug as discussed herein. An inner surface 296 of the pulling grip sleeve 292 contains a female threaded portion 298 on a first end 300. The pulling grip housing 294 contains a male threaded portion 302 on a first end 304 on the outer body 306 of the pulling grip housing 294. However, note that alternatively, the pulling grip sleeve 292 could be configured to contain a male threaded portion on its first end 300 and the pulling grip housing 294 could be configured to contain a female threaded portion on its first end 304. To insert and lock the pulling grip housing 294 to the pulling grip sleeve 292, the male threaded portion 302 of the pulling grip housing 294 is inserted into an opening 308 on the first end 300 of the pulling grip sleeve 292. Either the pulling grip housing 294 or the pulling grip sleeve 292 can be rotated about the other in the orientation of the threaded portions 298, 302 to tighten the connection. FIG. 16 depicts another variation of a pulling grip housing 394 where the first housing portion 396 and the second housing portion 398 are hingedly attached together, thereby creating fewer loose parts for the craft.

Figure 17:
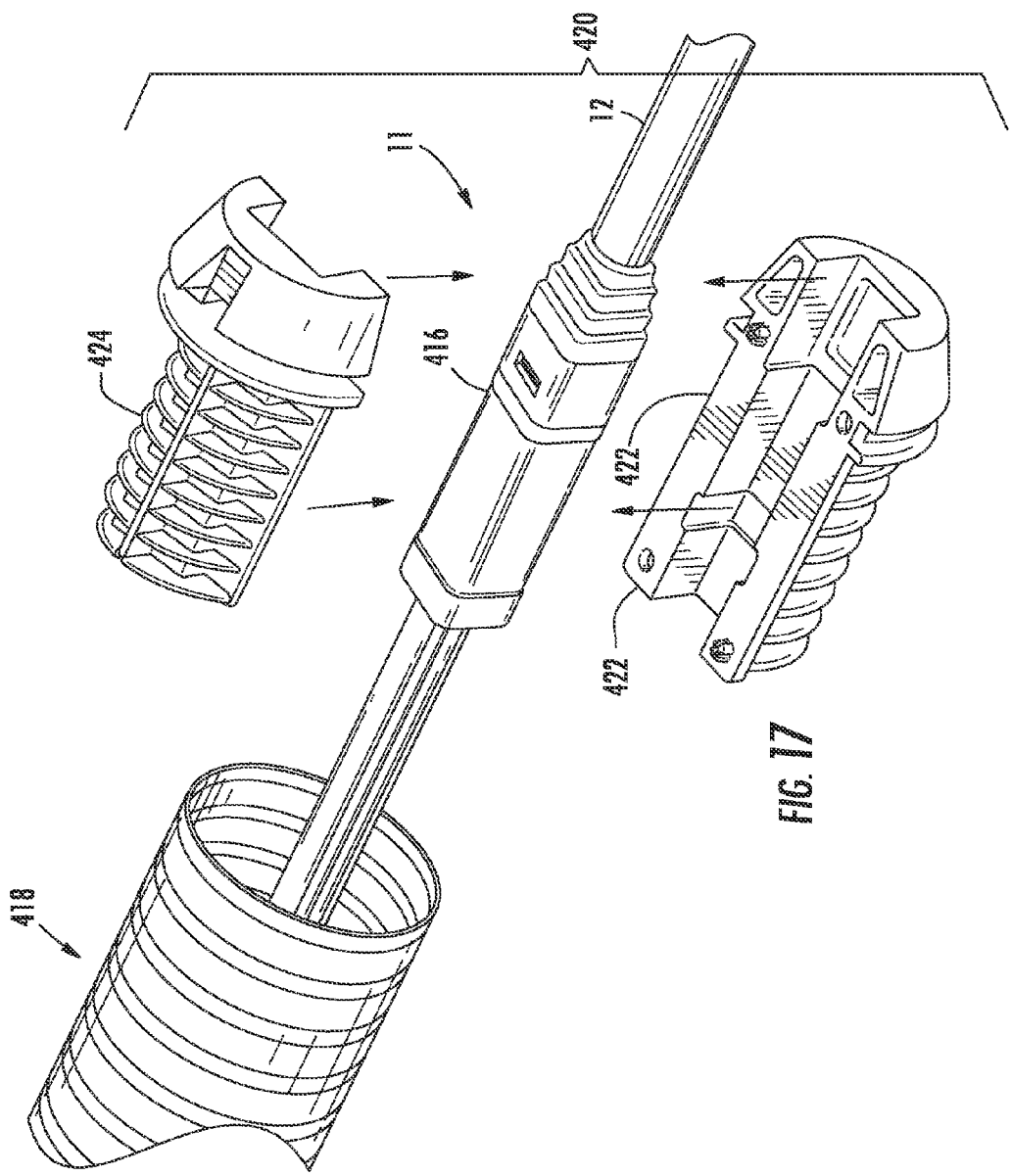
FIG. 17 is a perspective exploded view of another pulling grip.
Figure 18:
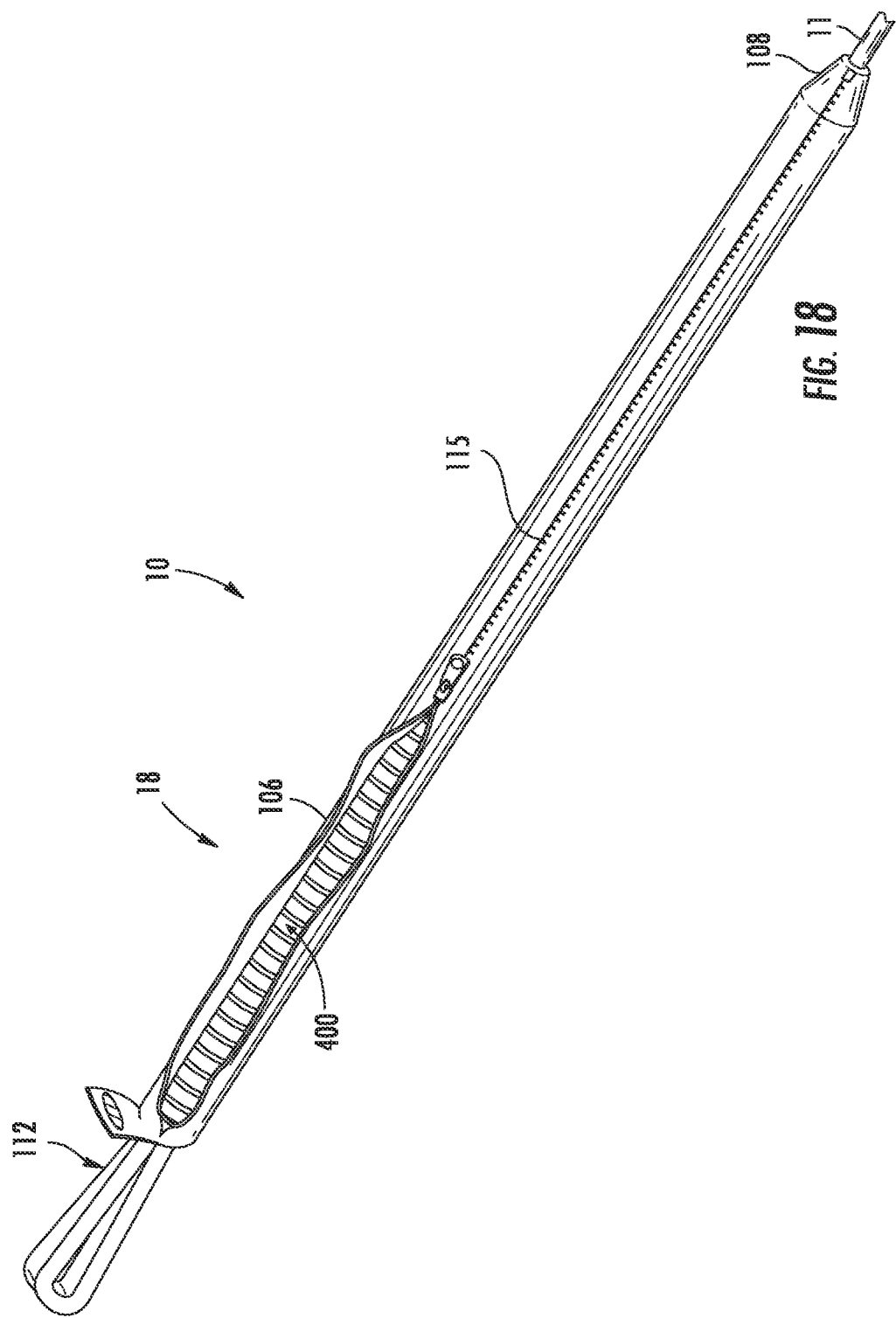
FIG. 18 is a perspective view showing the pulling grip of FIG. 17 placed within a pulling sock.

Other variations of the pulling grip disclosed herein are also possible. For instance, the pulling grip housing can omit the locking feature with the pulling grip sleeve and provide the anti-rotation feature in other ways. By way of example, FIG. 17 depicts a perspective exploded view of a pulling grip 400 that is similar to other embodiments having a pulling grip sleeve 418 and a pulling grip housing 420. Pulling grip housing 420 is comprised of a first housing portion 422 that is configured to mate with a second housing portion 424. An internal cavity 426 is formed inside the pulling grip housing 420 above for receiving the furcation plug 416 as disclosed in one or more of the embodiments described. By way of example, internal cavity 426 may include one or more notches or recesses that are tailored for fitting with the profile of the furcation body of the fiber optic assembly for transferring pulling forces thereto. In other embodiments, the first housing portion 422 may be hingedly attached or connected together in a suitable fashion to the second housing portion 424 to use fewer parts and/or reduce the risk of misplacing a portion of the pulling grip housing.

In this embodiment, the pulling grip housing 420 does not have a locking feature with pulling grip sleeve 418. However, pulling grip 400 still provides an anti-rotation feature for the fiber optic assembly 11 being pulling in by the craft. Specifically, the anti-rotation feature is provided by the friction fit between the outer portion of the pulling grip housing 420 and a portion of the inner surface of the pulling grip sleeve 418. The friction fit between the pulling grip housing 420 and the inner surface of pulling grip sleeve 418 advantageously inhibits twisting of fiber optic assembly 11 within the sleeve during installation. Pulling grip housing 420 is also shown with a ribbed construction (not numbered), which advantageously reduces the amount of material compared with a similarly sized part.

Pulling grip sleeve 418 is shown as a corrugated tube (i.e., ridges) for providing flexibility, but other types of pulling grip sleeves are possible. For instance, the use of a smooth wall tube is possible or a modular tube as disclosed herein. Other variations for the pulling grip housing, the fiber optic assembly, and the like may be incorporated into this embodiment as disclosed.

Because there is not a locking feature, pulling grip 400 uses a pulling sock 106 or the like placed over the pulling grip sleeve 418, thereby allowing the craft to attach a fish tape or line to the pulling sock loop 112 for pulling the fiber optic assembly into place. Simply stated, the distal end of pulling sock 106 is necked down such as with a conical portion 108 for engaging with the a portion of the pulling grip housing and/or pulling grip sleeve so that the pulling force is transferred to the furcation body/strength members or other suitable portion of the fiber optic assembly 11. In use, an end portion of fiber optic assembly 11 such as the furcation body is placed within the pulling grip housing 420 such as discussed in one of the several embodiments above. Next, the connectorized end of the fiber optic assembly is inserted into the pulling grip sleeve 418 so that a portion of the pulling grip housing 420 fits within the pulling grip sleeve 418. Unlike conventional pulling grips, the pulling grip housings disclosed only fit over a small portion of fiber optic assembly 11. In other words, the pulling grip housing does not fit over the connectors of fiber optic assembly 11, thereby allowing a flexible pulling grip. Additionally, the connectorized end of fiber optic assembly 11 may include a protective layer such as a plastic wrap or the like and to aid the insertion into the pulling grip sleeve. Thereafter, the assembly is placed within the pulling sock 106 so that the conical portion 108 of the pulling sock 106 engages pulling grip housing 420 and then is properly secured thereabout. Consequently, the craft can route and attach a fish tape or line to loop 112 of pulling sock 106 for installation. Furthermore, any of the embodiments discussed herein can be assembled and packaged on a reel in the factory for quick and easy deployment in the field.

Many modifications and other embodiments of the invention set forth herein will come to mind to one skilled in the art to which the invention pertains having the benefit of the teachings presented in the foregoing descriptions and the associated drawings. For example, these modifications include, but are not limited to, different types of fiber optic assemblies including fiber optic components that may or may not include a furcation plug, varied fiber count and diameter of a fiber optic cable and/or furcated legs received by the pulling grip, various diameters, lengths and/or sizes of the pulling grip, including the pulling grip housing and pulling grip sleeve, different manufacturing techniques for producing the pulling grip components, including the pulling grip housing and pulling grip sleeve, including but not limited to injection molding or extrusion, blow molding, machining, etc. and different types of materials used to construct the pulling grip, such as polyurethane foam and polyvinyl chloride (PVC), other suitable polymers, metals such as steel, braided hose, etc.

Therefore, it is to be understood that the invention is not to be limited to the specific embodiments disclosed and that modifications and other embodiments are intended to be included within the scope of the appended claims. It is intended that the present invention cover the modifications and variations of this invention provided they come within the scope of the appended claims and their equivalents. Although specific terms are employed herein, they are used in a generic and descriptive sense only and not for purposes of limitation.

What is claimed is:

1. A pulling grip assembly comprising:
   a furcated fiber optic assembly including a furcation body having one or more furcation legs with a connectorized end extending from the furcation body;
   a pulling grip housing having a first housing portion and second housing portion defining an internal cavity with the furcation body of the fiber optic assembly being disposed in the internal cavity, wherein the pulling grip housing does not fit over the connectorized end of the one or more furcation legs;
   a pulling grip sleeve being a corrugated tube defining an internal chamber, wherein the connectorized end of the one or more furcation legs are disposed in the internal chamber of the pulling grip sleeve, and further wherein the pulling grip housing fits within a portion of the pulling grip sleeve and has a friction fit with the pulling grip sleeve for inhibiting rotation between the pulling grip housing and the pulling grip sleeve; and
   a pulling sock disposed about the pulling grip sleeve and furcation body so that the pulling grip sleeve and furcation body are retained inside the pulling sock.

2. The pulling grip assembly of claim 1, the pulling sock having a pulling feature and a zipper.

3. The pulling grip assembly of claim 1, wherein the first housing portion and the second housing portion are connected together.

4. The pulling grip assembly of claim 1, wherein either the first housing portion or the second housing portion includes an internal compartment disposed within the internal cavity and configured to cradle part of a fiber optic assembly.

5. The pulling grip assembly of claim 4, wherein the internal compartment does not cradle an attachment feature or securing devices for a furcation body.

6. The pulling grip assembly of claim 4, wherein the internal compartment defines at least one compartment configured to receive at least one attachment feature of a furcation housing disposed in the fiber optic assembly.

7. The pulling grip assembly of claim 6, wherein the internal compartment further defines at least one compartment configured to receive at least one attachment device of the at least one attachment feature.

8. The pulling grip assembly of claim 7, wherein the at least one attachment device is at least one plunger.

9. The pulling grip assembly of claim 1, wherein the first housing portion and the second housing portion have a ribbed construction.

* * * * *